United States Patent
Abudi et al.

(10) Patent No.: US 10,261,804 B2
(45) Date of Patent: Apr. 16, 2019

(54) GRADUAL POWER WAKE-UP MECHANISM

(71) Applicant: QUALCOMM Incorporated, San Diego, CA (US)

(72) Inventors: Yizhaq Abudi, Even Yehuda (IL); Meir Agassy, Ramat Gan (IL); Arye Lerner, Kfar Yona (IL); Nathan Altman, San Diego, CA (US); Sandeep D'Souza, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 15/260,132

(22) Filed: Sep. 8, 2016

(65) Prior Publication Data
US 2017/0075700 A1 Mar. 16, 2017

Related U.S. Application Data

(60) Provisional application No. 62/217,538, filed on Sep. 11, 2015.

(51) Int. Cl.
*G06F 1/32* (2019.01)
*G06F 9/4401* (2018.01)
*G06K 9/00* (2006.01)
*G06F 21/32* (2013.01)
*G06F 1/3206* (2019.01)
(Continued)

(52) U.S. Cl.
CPC .......... *G06F 9/4418* (2013.01); *G06F 1/3206* (2013.01); *G06F 3/043* (2013.01); *G06F 3/0484* (2013.01); *G06F 3/04883* (2013.01); *G06F 9/4406* (2013.01); *G06F 21/32* (2013.01);
(Continued)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

2003/0194114 A1  10/2003  Mitsuyu et al.
2007/0047783 A1   3/2007  Kim et al.
(Continued)

FOREIGN PATENT DOCUMENTS

CN     105528592 A     4/2016
KR    20150139396 A    12/2015

OTHER PUBLICATIONS

International Search Report and Written Opinion—PCT/US2016/050909—ISA/EPO—dated Dec. 12, 2016.
(Continued)

*Primary Examiner* — Zahid Choudhury
(74) *Attorney, Agent, or Firm* — Silicon Valley Patent Group LLP

(57) ABSTRACT

Apparatuses and methods of a gradual power wake-up mechanism are disclosed. In one embodiment, a method of activating a device based on detection of a fingerprint image may include monitoring a first metric level of a first set of regions of the fingerprint image, determining a second metric level of a second set of regions of the fingerprint image in response to the first metric level exceeding a first threshold, and activating the device based on the second metric level of the second set of regions of the fingerprint image.

30 Claims, 14 Drawing Sheets

(51) Int. Cl.
*G06F 3/043* (2006.01)
*G06F 3/0484* (2013.01)
*G06F 3/0488* (2013.01)

(52) U.S. Cl.
CPC ....... *G06K 9/0002* (2013.01); *G06K 9/00087* (2013.01); *H04M 2250/22* (2013.01)

(56) References Cited

U.S. PATENT DOCUMENTS

| | | |
|---|---|---|
| 2009/0221272 A1 | 9/2009 | Fyke |
| 2014/0226879 A1* | 8/2014 | Westerman ........ G06K 9/00013 382/125 |
| 2014/0270415 A1* | 9/2014 | Alameh ............ G06K 9/00026 382/124 |
| 2014/0354556 A1 | 12/2014 | Alameh et al. |
| 2014/0354596 A1* | 12/2014 | Djordjev .............. G06K 9/0002 345/175 |
| 2015/0062020 A1* | 3/2015 | Pourbigharaz ........ G06F 3/0416 345/173 |
| 2015/0127965 A1* | 5/2015 | Hong .................... H04L 9/3231 713/323 |
| 2015/0137938 A1 | 5/2015 | Slaby et al. |

OTHER PUBLICATIONS

Joshi T., et al., "A Two-stage Algorithm for Core Point Detection in Fingerprint Images," Tencon 2009, IEEE, Jan. 23-26, 2009, pp. 1-6.

* cited by examiner

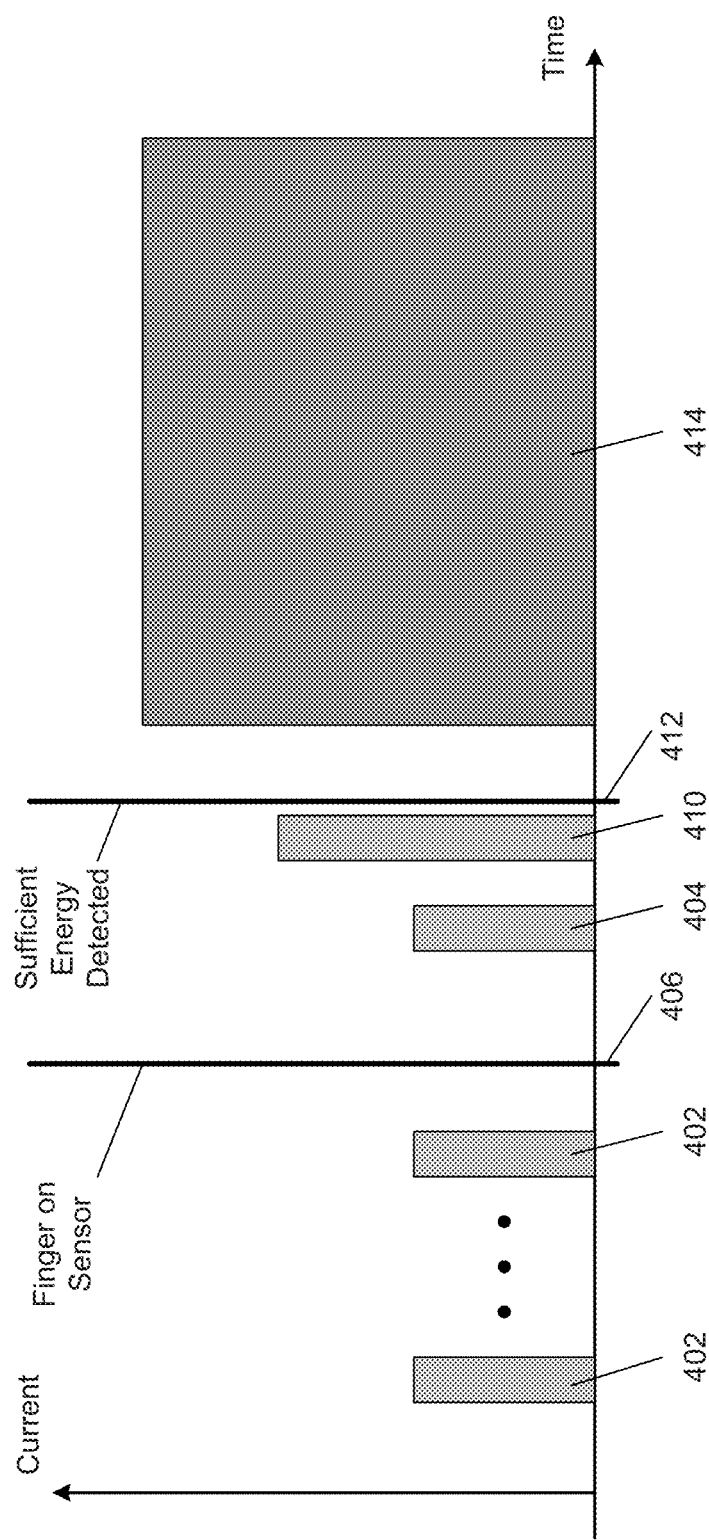

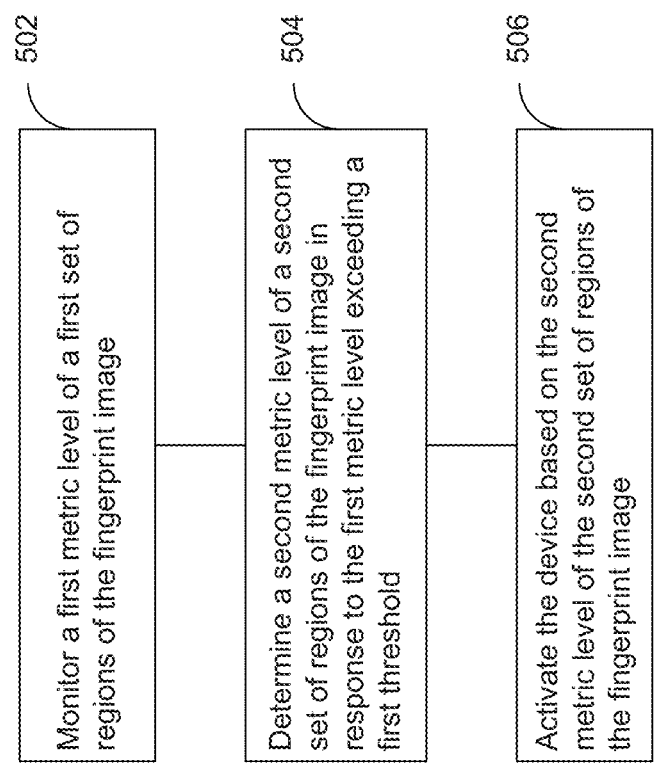

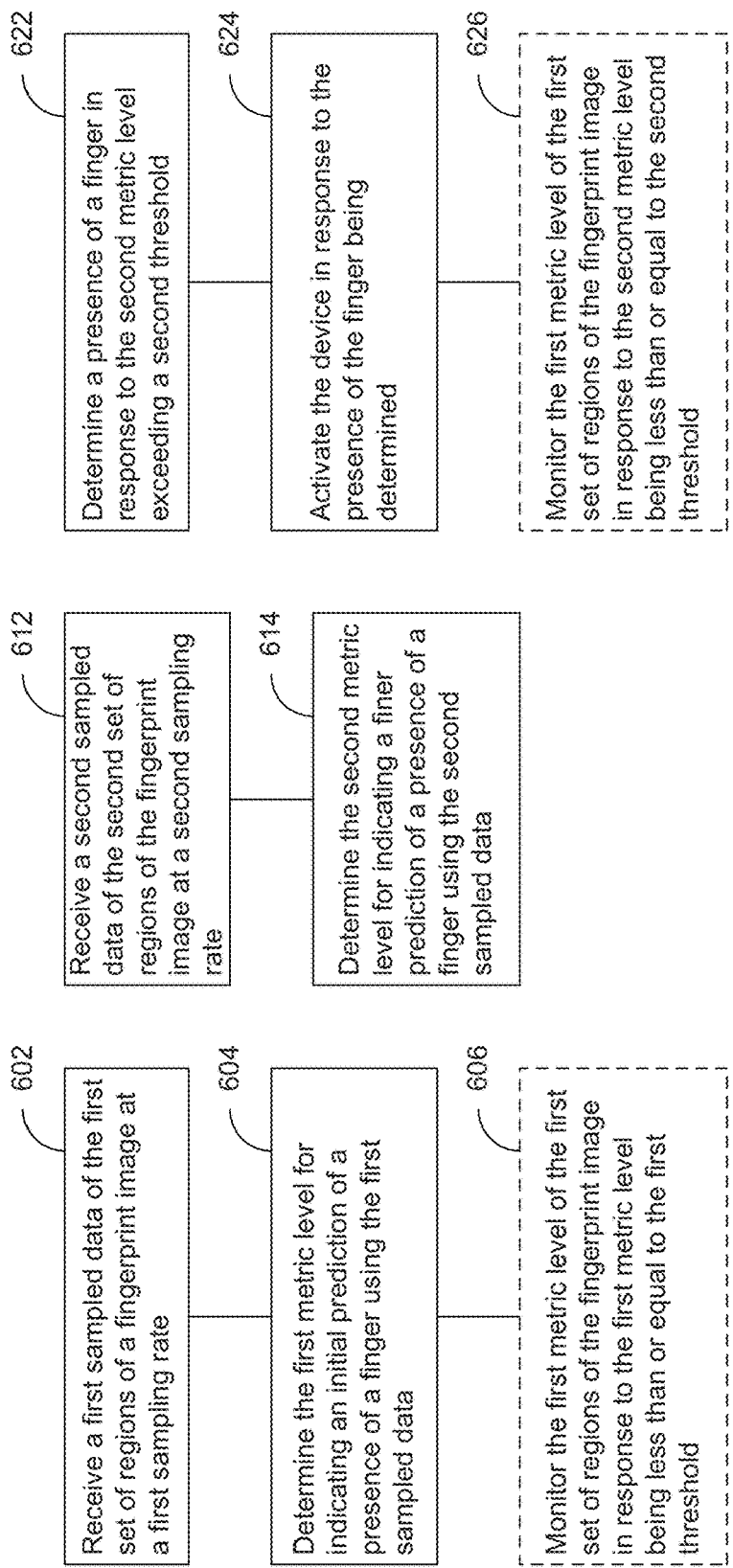

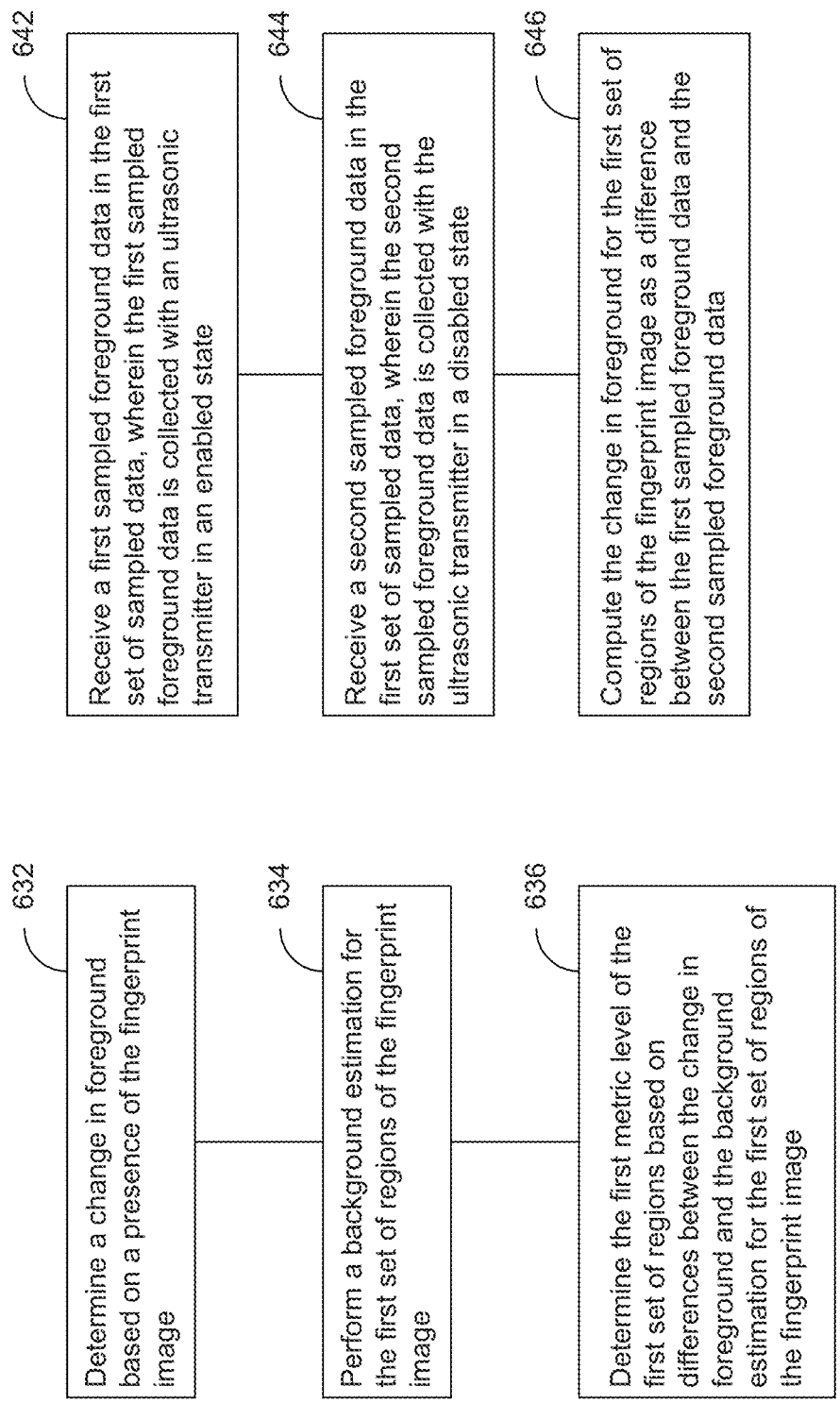

GRADUAL POWER WAKE-UP MECHANISM

CROSS REFERENCE TO RELATED APPLICATION

This application claims the benefit of U.S. patent application No. 62/217,538, "Gradual Power Wake Up Mechanism," filed Sep. 11, 2015, which is assigned to the assignee hereof. The aforementioned United States patent application is hereby incorporated by reference in its entirety.

FIELD

The present disclosure relates to the field of wireless communications. In particular, the present disclosure relates to wake-up mechanisms for mobile devices.

BACKGROUND

Conventional mobile devices may not be able to detect whether the device might be used or not in the near future until a user depresses an "on/off" button or touches a portion of the display. While in this uncertain state, conventional mobile devices may stay active or may become active periodically to perform a number of background tasks and data synchronizations in anticipation that the mobile device might be used. Such background tasks and data synchronizations may unnecessarily consume limited battery resources or consume communication/processing bandwidth. Therefore, it would be beneficial to use a wake-up mechanism that may conserve limited battery resources, conserve communication/processing bandwidth, or both, and/or in some other manner improve the operation of a mobile device.

SUMMARY

The present disclosure relates to apparatuses and methods of a gradual power wake-up mechanism. In one embodiment, a method of activating a device based on detection of a fingerprint image may include monitoring a first metric level of a first set of regions of the fingerprint image, determining a second metric level of a second set of regions of the fingerprint image in response to the first metric level exceeding a first threshold, and activating the device based on the second metric level of the second set of regions of the fingerprint image. The first metric level and the second metric level may represent at least one of an acoustic energy level, an acoustic loading level, a spatial frequency, a cross-correlation value, or an image quality value.

According to aspects of the present disclosure, the method of monitoring the first metric level of the first set of regions of the fingerprint image may include receiving first sampled data from the first set of regions of the fingerprint image at a first sampling rate and determining the first metric level for indicating an initial prediction of a presence of a finger using the first sampled data. The method may further include monitoring the first metric level of the first set of regions of the fingerprint image in response to the first metric level being less than or equal to the first threshold.

The method of determining the second metric level of the second set of regions of the fingerprint image may include receiving second sampled data from the second set of regions of the fingerprint image and determining the second metric level for indicating a finer prediction of a presence of a finger using the second sampled data. In some implementations, the second set of regions may include a portion of an active area of an ultrasonic sensor or the entire active area of the ultrasonic sensor.

The method of activating the device based on the second metric level of the second set of regions of the fingerprint image may include determining a presence of a finger in response to the second metric level exceeding a second threshold and activating the device in response to the presence of the finger. The method may further include monitoring the first metric level of the first set of regions of the fingerprint image in response to the second metric level being less than or equal to the second threshold.

The method of determining the first metric level of the first set of regions of the fingerprint image may include determining a change in foreground based on a presence of the fingerprint image, performing a background estimation for the first set of regions of the fingerprint image, and determining the first metric level of the first set of regions based on differences between the change in foreground and the background estimation for the first set of regions of the fingerprint image.

The method of determining the change in foreground may include receiving first sampled foreground data in the first set of sampled data where the first sampled foreground data is collected with an ultrasonic transmitter in an enabled state, receiving second sampled foreground data in the first set of sampled data where the second sampled foreground data is collected with the ultrasonic transmitter in a disabled state, and computing the change in foreground for the first set of regions of the fingerprint image as a difference between the first sampled foreground data and the second sampled foreground data.

The method of performing the background estimation may include determining an updated acquisition time delay and an updated ultrasonic transmitter frequency in accordance with a variation of a current temperature from a reference temperature from which an initial background estimation and an initial ultrasonic transmitter frequency are determined, acquiring background image information based on the updated acquisition time delay and the updated ultrasonic transmitter frequency, and computing the background estimation using the background image information.

The method may further include at least one of reducing background noise based on autocorrelation of the pixels in the first set of regions, reducing sensor artifacts by removing quiescent values in the first sampled data, or a combination thereof.

The method may further include receiving third sampled data from a third set of regions of the fingerprint image, determining a third metric level of the third set of regions for indicating an enhanced prediction of a presence of a finger using the third sampled data, and activating the device based on a combination of the second metric level and the third metric level, where the third set of regions includes more pixels than the second set of regions and where the second set of regions includes more pixels than the first set of regions.

In some implementations, a device may include a sensor having a plurality of sensor pixels configured to sense a fingerprint image, a memory configured to store the fingerprint image, and a controller. The controller may be configured to monitor a first metric level of a first set of regions of the fingerprint image, determine a second metric level of a second set of regions of the fingerprint image in response to the first metric level exceeding a first threshold where the second set of regions includes more pixels than the first set of regions, and activate the device based on the second metric level of the second set of regions of the fingerprint image.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the non-limiting and non-exhaustive aspects of following drawings. Like numbers are used throughout the figures.

FIG. 4B illustrates another example of power consumption over time in the method of FIG. 2 according to aspects of the present disclosure.

FIG. 5 illustrates a method of activating a device based on detection of a fingerprint image according to aspects of the present disclosure.

FIG. 6A illustrates a method of monitoring a first metric level of a first set of regions of the fingerprint image of FIG. 5 according to aspects of the present disclosure.

FIG. 6B illustrates a method of determining a second metric level of a second set of regions of the fingerprint image of FIG. 5 according to aspects of the present disclosure.

FIG. 6C illustrates a method of activating the device based on the second metric level of the second set of regions of the fingerprint image of FIG. 5 according to aspects of the present disclosure.

FIG. 6D illustrates an exemplary method of determining a metric level for a set of regions of the fingerprint image according to aspects of the present disclosure.

FIG. 6E illustrates an exemplary method of determining the change in foreground for a set of regions of the fingerprint image according to aspects of the present disclosure.

DESCRIPTION OF EMBODIMENTS

Embodiments of a gradual power wake-up mechanism are disclosed. The following descriptions are presented to enable a person skilled in the art to make and use the disclosure. Descriptions of specific embodiments and applications are provided only as examples. Various modifications and combinations of the examples described herein may be readily apparent to those skilled in the art, and the general principles defined herein may be applied to other examples and applications without departing from the scope of the disclosure. Thus, the present disclosure is not intended to be limited to the examples described and shown, but is to be accorded the scope consistent with the principles and features disclosed herein. The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

Figure 1A:
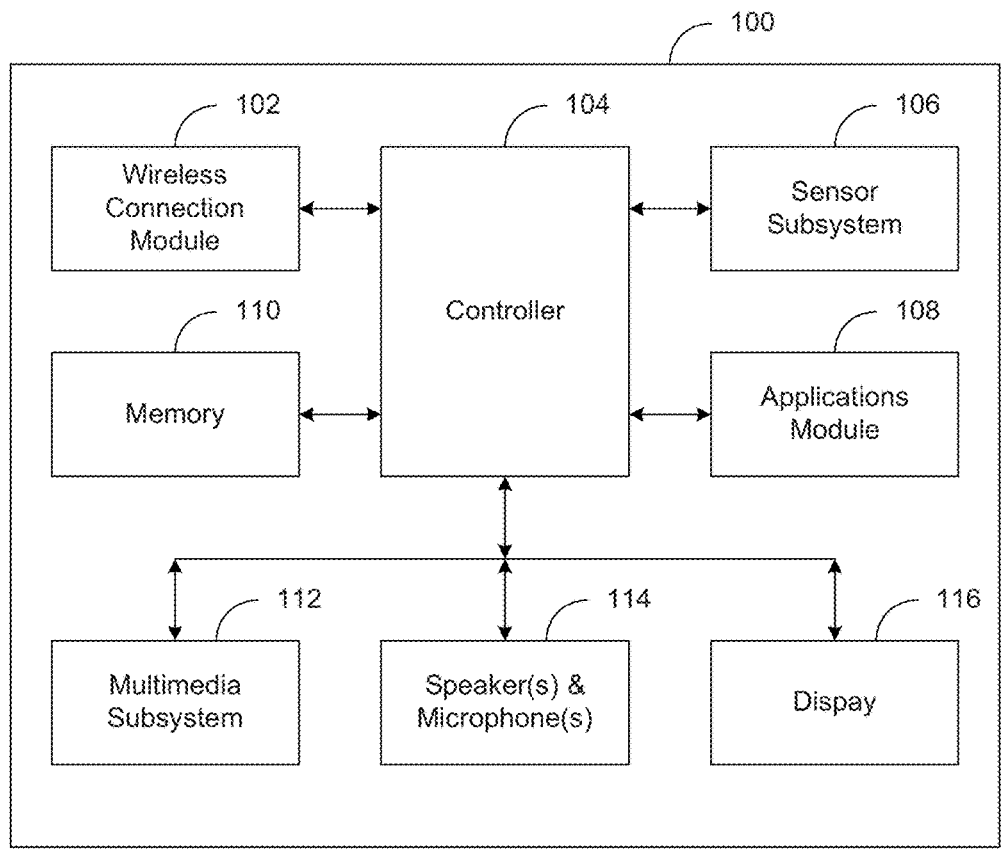
FIG. 1A illustrates an exemplary block diagram of a mobile device according to aspects of the present disclosure.

FIG. 1A illustrates an exemplary block diagram of a mobile device according to aspects of the present disclosure. In the example shown in FIG. 1A, a mobile device 100 may include wireless connection module 102, controller 104, sensor subsystem 106, memory 110 and applications module 108. The mobile device 100 may optionally include multi-media subsystem 112, speaker(s) and microphone(s) 114, and display 116. In some implementations, the wireless connection module 102 may be configured to support WiFi and/or Bluetooth in a wireless local area network (LAN) or wireless personal area network (PAN). The controller 104 may include one or more processors, software, hardware, and firmware to implement various functions described herein. For example, the controller 104 may be configured to implement functions of the mobile device 100 as described in FIG. 2 to FIG. 6. The sensor subsystem 106 may be configured to sense and process various sensor input data and produce sensor output data to the controller 104. The applications module 108 may include a battery charging circuit and power manager, oscillators, phase lock loops, clock generators and timers.

In some implementations, the sensor subsystem 106 may be configured to sense and detect a user's finger in low power conditions. For example, the sensor subsystem 106 may be configured to include a sensor having a plurality of sensor pixels that may be configured as a low-power detector (not shown), such as a 270-pixel detector configuration, to determine energy levels of certain areas of the fingerprint image and to make an initial prediction of the presence of a finger. In some implementations, the plurality of sensor pixels may be configured as an intermediate-level detector, such as a 1782-pixel detector configuration, to determine energy levels of certain areas of the fingerprint image that may include the sensor pixels of the low-power detector configuration. The intermediate-level detector may be configured to make a finer prediction of the presence of a finger. In some implementations, the plurality of sensor pixels may be configured as an enhanced detector, where all of the pixels in the sensor are utilized to determine the presence of a finger using the methods described herein. The controller 104 may be engaged to work with the low-power detector configuration, the intermediate-level detector configuration, and/or the enhanced detector configuration to determine the presence of a finger. The controller 104 and associated components of the sensor subsystem 106 typically consume more power and require more signal processing resources when engaged to work with the full-sensor detector than the low-power detector configuration or the intermediate-level detector configuration operated by the sensor subsystem 106.

In certain embodiments, mobile device 100 may include a wireless transceiver that is capable of transmitting and receiving wireless signals via a wireless antenna over a wireless communication network. Some embodiments may include multiple wireless transceivers and wireless antennas to enable transmitting and/or receiving signals according to corresponding multiple wireless communication standards such as, for example, versions of IEEE Std. 802.11, CDMA, WCDMA, LTE, UMTS, GSM, AMPS, Zigbee and Bluetooth, etc.

Wireless connection module 102 may include an SPS receiver capable of receiving and acquiring SPS signals via an SPS antenna. The SPS receiver may also process, in whole or in part, acquired SPS signals for estimating a location of mobile device 100. In some embodiments, controller 104 and memory 110 may also be utilized to process acquired SPS signals, in whole or in part, and/or calculate an estimated location of mobile device 100, in conjunction with the SPS receiver. SPS or other signals for use in performing positioning operations may be stored in memory 110 or registers (not shown).

In various embodiments, controller 104 may be configured to execute one or more machine-readable instructions stored in memory 110 such as on a computer-readable storage medium, such as RAM, ROM, FLASH, or disc drive, just to name a few examples. The one or more instructions may be executable by one or more processors, specialized processors, or DSPs. Memory 110 may include a non-transitory processor-readable memory and/or a computer-readable memory that stores software code (programming code, instructions, etc.) that are executable by the processors and/or DSPs to perform functions described herein. Controller 104 may execute instructions to perform one or more aspects of processes/methods discussed below in connection with FIG. 2 to FIG. 6.

In some implementations, a user interface may include any one of several devices such as, for example, multimedia subsystem 112, speakers and microphones 114, display 116, etc. In a particular implementation, the user interface may enable a user to interact with one or more applications hosted on mobile device 100. For example, devices may store analog or digital signals in memory 110 to be further processed by controller 104 in response to an action from a user. Similarly, applications hosted on mobile device 100 may store analog or digital signals on memory 110 to present an output signal to a user.

Mobile device 100 may also include a camera for capturing still or moving imagery. The camera may include, for example, an imaging sensor (e.g., charge coupled device or CMOS imager), lens, analog to digital circuitry, frame buffers, etc. In some implementations, additional processing, conditioning, encoding or compression of signals representing captured images may be performed by controller 104. Alternatively, a video processor may perform conditioning, encoding, compression or manipulation of signals representing captured images. Additionally, the video processor may decode/decompress stored image data for presentation on display 116 of mobile device 100.

Figure 1B:
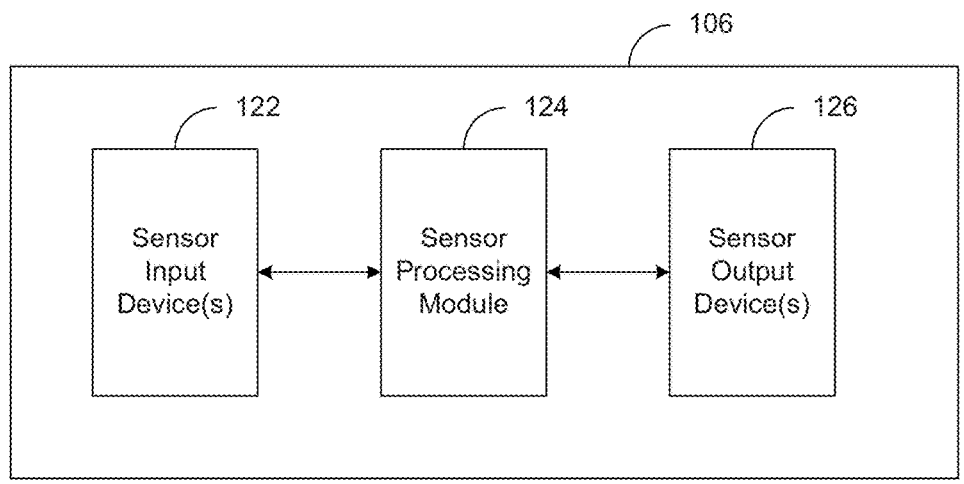
FIG. 1B illustrates an exemplary implementation of the sensor subsystem of the mobile device of FIG. 1A according to aspects of the present disclosure.

FIG. 1B illustrates an exemplary implementation of the sensor subsystem of the mobile device of FIG. 1A according to aspects of the present disclosure. Sensor subsystem 106 may generate analog or digital signals that may be stored in memory 110 and processed by controller 104 in support of one or more applications such as, for example, applications relate to activating a device based on detection of a fingerprint image.

As shown in FIG. 1B, the sensor subsystem 106 may include one or more sensor input devices 122, sensor processing module 124, and one or more sensor output devices 126. The one or more sensor input devices 122 may include the low-power (fingerprint image) detector configuration and the intermediate-level (fingerprint image) detector configuration as described above in association with FIG. 1A. The one or more sensor input devices 122 may also include one or more of keys and buttons, ultrasonic sensors, temperature and moisture sensors, microphones, ultrasound microphone arrays, photo detectors, image sensors, touch sensors, pressure sensors, chemical sensors, gyroscopes, accelerometers, magnetometers, GPS, and compass. The sensor processing module 124 may be configured to perform one or more of the following functions, including but not limited to: input sensor selection and control, synchronization and timing control, signal processing, sensor platform performance estimation, sensor optimization, sensor fusion, and output sensor/device selection and control. The one or more sensor output devices 126 may produce one or more ultrasonic, voice, visual, biometric, nearness, presence, pressure, stability, vibration, location, orientation, heading, kinetics and chemical signals. The sensor subsystem 106 may be configured to implement functions of activating a device based on detection of a fingerprint image as described in FIG. 2 to FIG. 6.

The sensor processing module 124 may be configured to process sensor input data from the one or more sensor input devices 122, and produce output commands or signals to the one or more sensor output devices 126 and/or to the one or more optional active sensor output devices. According to aspects of the present disclosure, direct user inputs may be used to predictably manipulate power control behavior. In some embodiments, a mobile device may be configured to accept user commands (via direct, voice/aural and/or visual inputs) and be configured to sense a multitude of use, use environment and use contexts.

In some implementations, the sensor processing module 124 may include an application-specific integrated circuit (ASIC) that includes circuitry such as a plurality of voltage regulators for generating a plurality of power supply voltages; memory, finite-state machines, level shifters and other associated circuitry for generating control signals to an ultrasonic fingerprint sensor having a plurality of sensor pixels; circuitry for generating transmitter excitation signals, range-gate delay signals, diode bias signals and receiver bias signals to the ultrasonic sensor; circuitry for analog signal conditioning, analog-to-digital conversion and digital processing of the received pixel output signals from the ultrasonic sensor; and interface circuitry for sending digital output signals to an applications processor of a mobile device. The applications processor may execute the methods described in this disclosure. For purposes of minimizing power consumption, the methods may be executed on an isolated low-power island of the applications processor so that power need not be supplied to the entire applications processor when in sleep mode. In a low-power sleep mode, the applications processor may command the ASIC to access and acquire output signals from a limited number of sensor pixels, and subsequently the applications processor may process the digitized information from the ASIC to make a determination on finger presence.

In other implementations, in addition to the ASIC circuitry described in the prior paragraph, the ASIC may also include a microcontroller to autonomously execute one or more initial stages of the wake-up algorithm locally on the ASIC. If the initial prediction of the presence of a finger is positive, the microcontroller in the ASIC may communicate via an interrupt mechanism with the applications processor and wake up a portion or more of the applications processor to make an intermediate or enhanced determination of the presence of the finger. For overall low-power operation, it may be desirable that the microcontroller make determinations before requesting and enlisting the processing resources of the applications processor and other components of the mobile device. In some implementations, the intermediate and/or enhanced determination of the presence of a finger may be performed by the applications processor, in part by accessing and acquiring output signals from a larger set of sensor pixels, which may include the entire active area of the sensor. If the presence of a finger has been detected, fingerprint image information may be acquired and used for matching with enrolled fingerprint information and authentication of a candidate user, along with other functions of the applications processor.

In yet other implementations, in addition to the microcontroller and ASIC circuitry noted above, the ASIC may also include the ultrasonic sensor pixel array and associated circuitry such as row-drivers and column-gate drivers to scan the pixels. In these implementations, the ASIC may execute the functions of sensing the sensor pixel output signals in addition to the functions of finger presence detection and other functions described herein.

Figure 2:
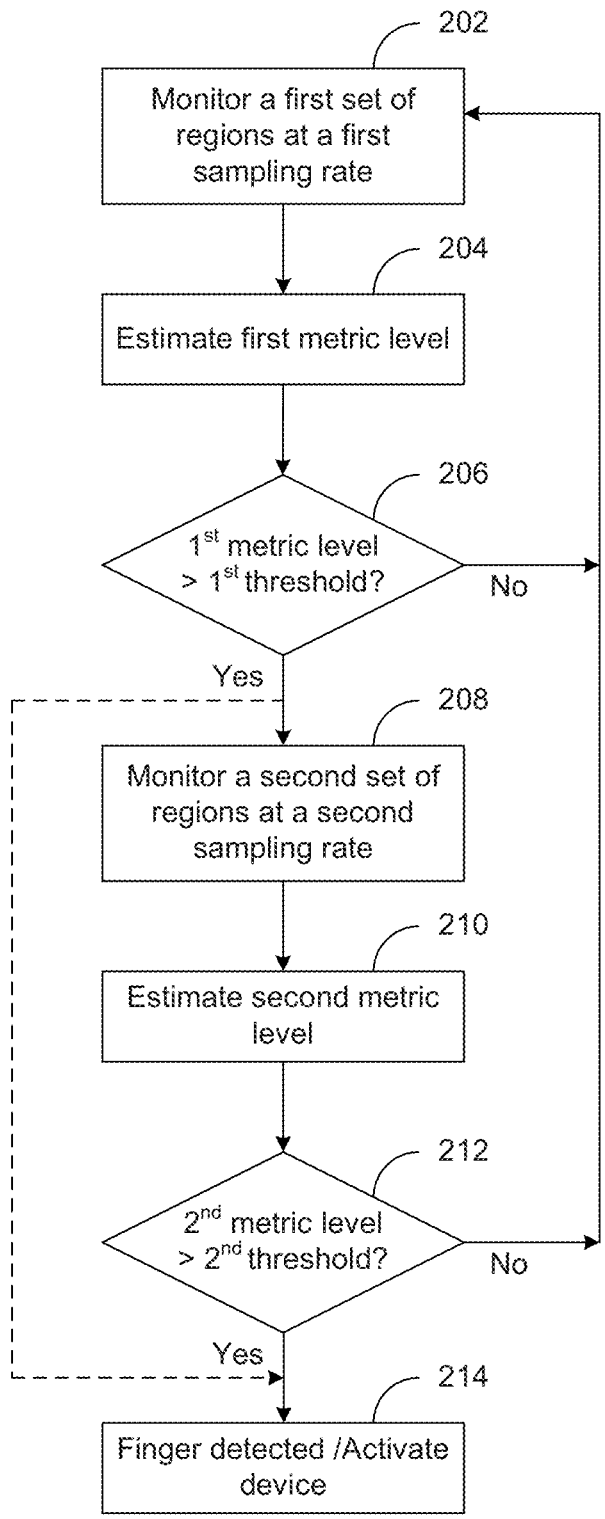
FIG. 2 illustrates an example of a gradual power wake-up mechanism according to aspects of the present disclosure.

FIG. 2 illustrates a gradual power wake-up mechanism according to aspects of the present disclosure. In the exemplary gradual power wake-up mechanism shown in FIG. 2, in block 202, a device is configured to monitor a first set of regions at a first sampling rate, for example using the low-power detector configuration described in FIG. 1A. In some implementations, the first sampling rate may be 5 Hz, 10 Hz, 20 Hz, 100 Hz or other sampling rate, depending on the size of the fingerprint image being monitored, resolution, power consumption, and/or other factors. In block 204, the device may be configured to estimate a first metric level of the first set of regions of the fingerprint image. In some implementations, the first metric level is a measurement of reflected acoustic energy being received at a piezoelectric receiver from the first set of regions. The first metric level may be used to indicate an initial prediction of whether an object or a user's finger has been detected. In other implementations, other metrics and their associated metric levels may be employed to detect the object or the user's finger, such as fingerprint features (e.g., ridges and valleys), presence of certain spatial frequencies, acoustic impedance, etc.

In block 206, the device may be configured to determine, for example by controller 104 and/or sensor processing module 124, whether the first metric level exceeds a first threshold. If the first metric level exceeds the first threshold (206_Yes), the method may move to block 208. Alternatively, if the first metric level does not exceed the first threshold (206_No), the method may move back to block 202, where the process of monitoring a first metric level of a first set of regions of the fingerprint image is repeated.

In block 208, the device may be configured to monitor a second set of regions of the fingerprint image at a second sampling rate, for example using the intermediate-level detector configuration as described in FIG. 1A. In some implementations, the second sampling rate may be just once or at a frequency depending on the size of the fingerprint image being monitored, resolution, power consumption, and/or other factors. In some implementations, the second sampling rate may be equal to or faster than the first sampling rate. In block 210, the device may be configured to estimate a second metric level of the second set of regions of the fingerprint image. In some implementations, the second metric level is a measurement of reflected acoustic energy being received at a piezoelectric receiver from the second set of regions. The second metric level may be used to indicate a finer prediction of whether an object or a user's finger has been detected. In other embodiments, other metrics and their associated metric levels may be employed to detect the object or the user's finger, such as fingerprint features like ridges and valleys, presence of certain spatial frequencies, acoustic impedance, etc.

In block 212, the device may be configured to determine, for example by controller 104 and/or sensor processing module 124, whether the second metric level exceeds a second threshold. If the second metric level exceeds the second threshold (212_Yes), the method moves to block 214. Alternatively, if the second metric level does not exceed the second threshold (212_No), the method may move back to block 202, where the process of monitoring a first metric level of a first set of regions of the fingerprint image is repeated.

In some embodiments, blocks 208, 210 and 212 may be bypassed, indicated by the dashed line from block 206 to block 214, in response to the first metric level exceeding a first threshold.

In block 214, the controller 104 and/or sensor processing module 124 may determine whether a user's finger has been detected in response to the second metric level exceeding a second threshold, and send a signal to activate the device in response to the user's finger being detected. Alternatively or additionally, the sensor processing module 124 may further analyze the fingerprint image of the entire active sensor area to determine whether the user's finger has been detected and activate the device in response to the user's finger being detected.

According to aspects of the present disclosure, sampled data may be collected from a third set of regions of the fingerprint image. In some exemplary implementations, controller 104 and/or sensor processing module 124 may be configured to receive third sampled data from a third set of regions of the fingerprint image, and determine a third metric level of the third set of regions for indicating an enhanced prediction of a presence of a finger using the third sampled data, and activating the device based on a combination of the second metric level and the third metric level, where the second set of regions includes more pixels than the first set of regions, and the third set of regions includes more pixels than the second set of regions. In one approach, the third set of regions may include the entire sensing region (e.g., entire active area) of the fingerprint image, such as the active area of an ultrasonic sensor array. For example, the first set of regions may be a 270-pixel detector configuration, the second set may be a 1782-pixel detector configuration, and the third set may be an entire active area of a 14,400-pixel detector. In this implementation, the mobile device may be taken out of a sleep mode and activated (e.g., woken up), when threshold values are exceeded for each of the 270-pixel detector configuration, the 1782-pixel detector configuration, and the 14,400-pixel detector (entire active area) configuration.

Figure 3:
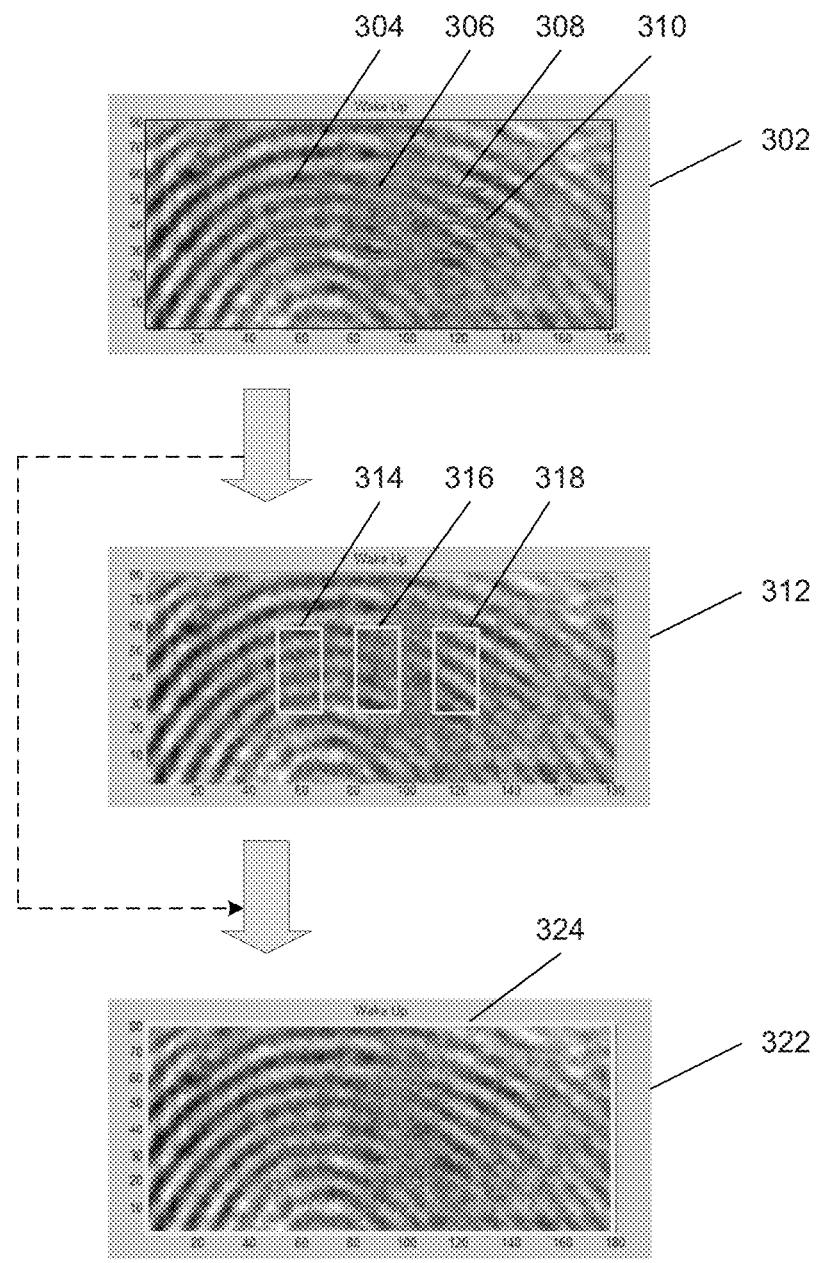
FIG. 3 illustrates exemplary sensor implementations of the gradual power wake-up mechanism of FIG. 2 according to aspects of the present disclosure.

FIG. 3 illustrates exemplary implementations of the gradual power wake-up mechanism of FIG. 2 according to aspects of the present disclosure. As shown in FIG. 3, block 302 represents an exemplary fingerprint image being monitored in block 202 of FIG. 2. Lines 304, 306, 308, 310, etc. represent the first set of regions of the fingerprint image being sampled at the first sampling rate. As noted above, at this stage, a low-power detector configuration, such as a 270-pixel detector configuration, the controller 104 and/or the sensor processing module 124 may be used to estimate the first metric level and compare the first metric level to the first threshold as described in blocks 202 to 206 of FIG. 2.

Similarly, block 312 represents the fingerprint image being monitored in block 208 of FIG. 2. Clusters 314, 316, and 318 represent the second set of regions of the fingerprint image being sampled at the second sampling rate. At this stage, an intermediate-level detector configuration, such as a 1782-pixel detector configuration, the controller 104 and/or the sensor processing module 124 may be used to estimate the second metric level and compare the second metric level to the second threshold as described in blocks 208 to 212 of FIG. 2.

In the event the second metric level exceeds the second threshold, the presence of a user's finger may be detected and a signal may be sent by the controller 104 and/or the sensor processing module 124 of the sensor subsystem 106 to turn on the device 100. After the device 100 has been turned on, block 322 represents the fingerprint image being monitored. In some embodiments, block 312 may be bypassed, indicated by a dashed line from block 302 to block 322, in response to the first metric level exceeding a first threshold, as described in blocks 202 to 206 of FIG. 2. Block 324 represents a full-sensor detector configuration, such as a 14,400-pixel detector configuration, that may be used to monitor subsequent operations, for example subsequent uses of the device 100. In some implementations, the 14,400-pixel detector configuration represents the entire active area of a fingerprint sensor. In some implementations, the fingerprint sensor may serve as a home button or other type of button in device 100.

Figure 4A:
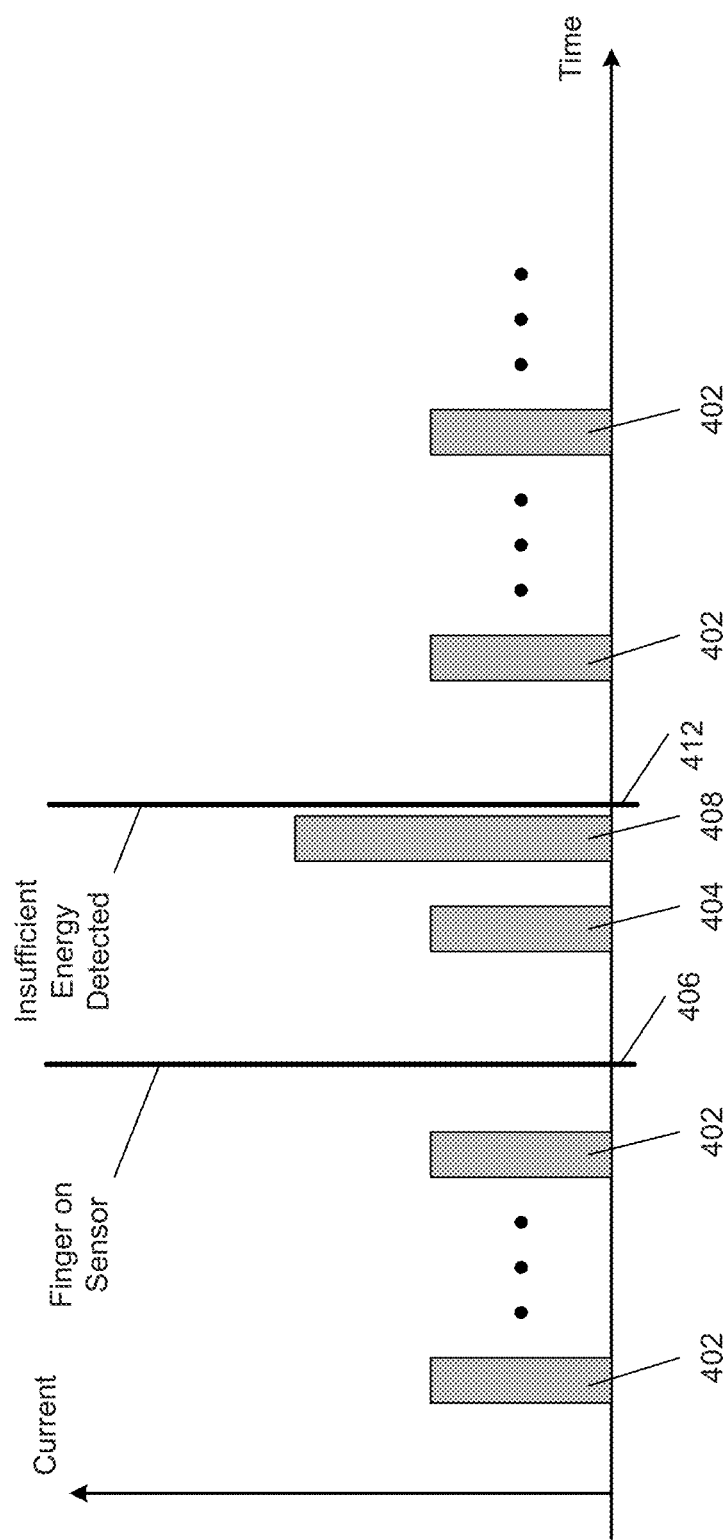
FIG. 4A illustrates an example of power consumption over time in the method of FIG. 2 according to aspects of the present disclosure.

FIG. 4A illustrates an example of power consumption over time for executing portions of the method of FIG. 2 according to aspects of the present disclosure. In this example, in the standby mode, the power consumed by the sensor subsystem 106 is represented by numeral 402. Power is consumed to acquire samples in the first set of regions at the first sampling rate, to estimate an energy level, and to compare the estimated energy level to a threshold. In this mode, only a small set of the pixels of the fingerprint image are sampled and the number of computations may be significantly reduced. Both factors contribute to reducing the power consumption in the standby mode.

At time 406, assuming a finger has been preliminarily detected, the device may continue to perform the gradual power wake-up mechanism as described in FIG. 2. Numeral 404 represents the power consumed for blocks 202 to 206 of FIG. 2. Assuming the first metric level exceeds the first threshold (206_Yes in FIG. 2), numeral 408 represents the power consumed for blocks 208 to 212. If the second metric level does not exceed the second threshold (i.e., insufficient energy detected) at time 412, the device may return to the standby mode, indicated by intervals of power consumption after time 412 being represented by numeral 402.

FIG. 4B illustrates another example of power consumption over time for executing portions of the method of FIG. 2 according to aspects of the present disclosure. In this example, the events of the standby mode before time 406 are similar to that of FIG. 4A.

At time 406, assuming the sensor may have sensed a finger, the device may continue to perform the gradual power wake-up mechanism as described in FIG. 2. Numeral 404 represents the power consumed for blocks 202 to 206 of FIG. 2. Assuming the first metric level exceeds the first threshold (206_Yes in FIG. 2), numeral 410 represents the power consumed for blocks 208 to 212. In this case, if the second metric level exceeds the second threshold (i.e., sufficient energy detected) at time 412, the presence of a user's finger may be detected and the device may be turned on. Numeral 414 represents the power consumption of the device after it is turned on. After the device is activated, a full-sensor detector configuration, such as the one shown in FIG. 3 (324), may be configured to support subsequent operations, and the controller 104 may be configured to control the full-sensor detector configuration.

Figure 4C:
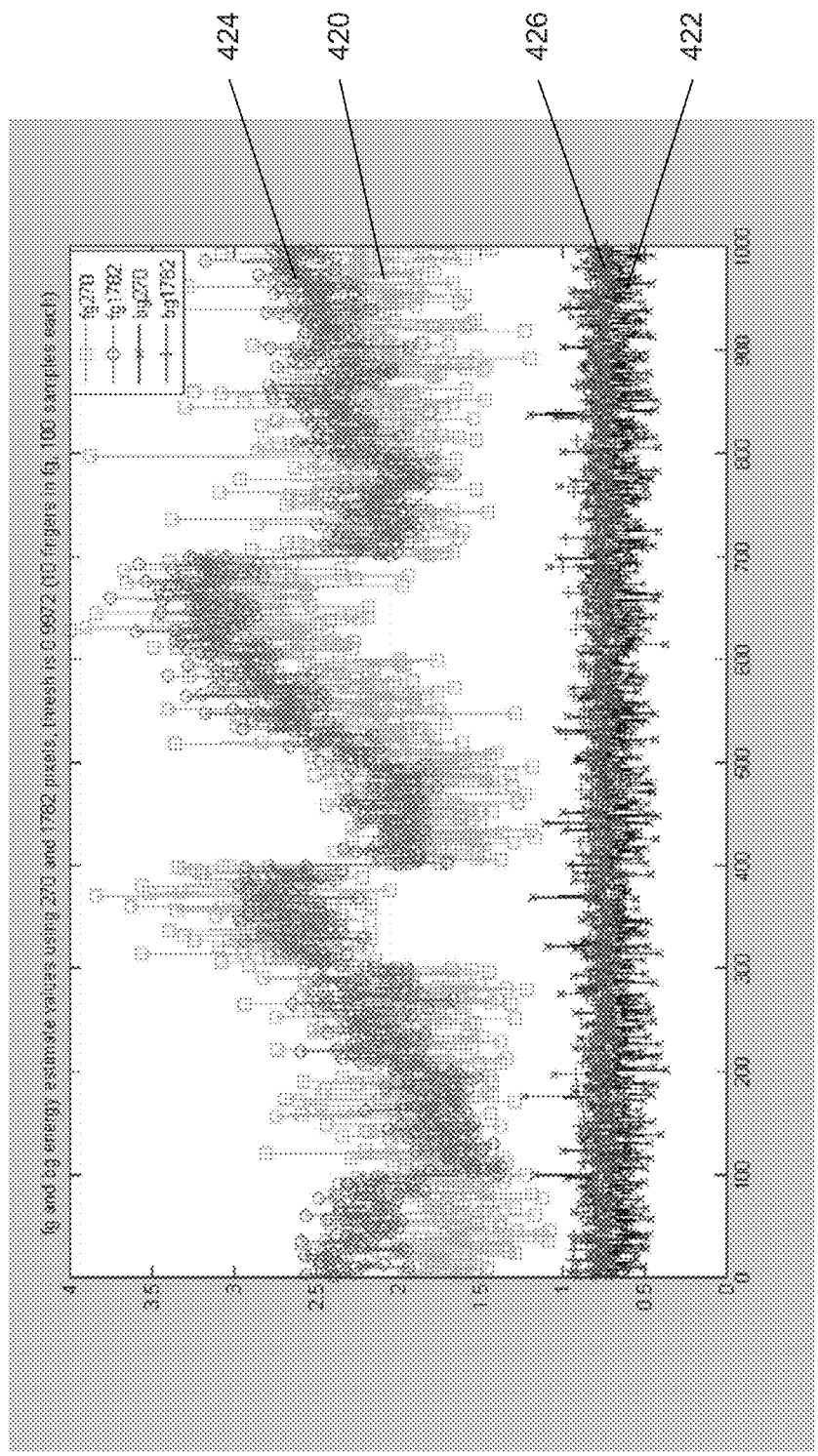
FIG. 4C illustrates exemplary implementation results of the gradual power wake-up mechanism of FIG. 2 according to aspects of the present disclosure.

FIG. 4C illustrates exemplary implementation results of the gradual power wake-up mechanism of FIG. 2 according to aspects of the present disclosure. In this exemplary implementation, one thousand data points are plotted of a finger touching a platen of the sensor, showing ten different finger touches with one hundred data points for each finger touch. Each data point represents a metric level calculated with either the 270-pixel detector configuration or the 1782-pixel detector configuration and with either a finger on the sensor (plotted points 420 and 424) or a finger off the sensor (plotted points 422 and 426, respectively). A threshold value (e.g. a first threshold value and a second threshold value) used is 0.9972. As shown in FIG. 4C, plotted points 420 represent results of a low-power 270-pixel detector configuration with a finger on the sensor; plotted points 424 represent results of an intermediate-level 1782-pixel detector configuration with a finger on the sensor; plotted points 422 represent results of the low-power 270-pixel detector configuration with no finger on sensor; and plotted points 426 represent results of the intermediate-level 1782-pixel detector configuration with no finger on the sensor. With a threshold value of 0.9972, metric levels for the 270-pixel detector configuration and the 1782-pixel detector configuration are clearly differentiated between a finger on and a finger off the sensor, with the 1782-pixel detector configuration showing smaller variation and higher separation.

FIG. 5 illustrates a method of activating a device based on detection of a fingerprint image according to aspects of the present disclosure. As shown in FIG. 5, in block 502, the method may monitor a first metric level of a first set of regions of the fingerprint image. In block 504, the method may determine a second metric level of a second set of regions of the fingerprint image in response to the first metric level exceeding a first threshold. In block 506, the method may activate the device based on the second metric level of the second set of regions of the fingerprint image. In some implementations, the second set of regions may correspond to a portion of the sensor pixels in the sensor. In some implementations, the second set of regions may correspond to the entire active area (e.g., all sensor pixels) of the sensor. Optionally, the method may monitor a third area of the fingerprint image, and conduct user interface operations with the device using the third area of the fingerprint image. The third area may correspond to a third set of regions, which in some implementations may be the entire active area of the sensor.

According to aspects of the present disclosure, the first metric level may correspond to at least one of an acoustic energy level, an acoustic loading level, a spatial frequency, a cross-correlation value, an image quality value, or some combination thereof. In some implementations, an acoustic energy level may be determined by comparing the output signals from one or more sensor pixels in the first set of regions to a background or quiescent value acquired with the ultrasonic transmitter off (e.g., disabled), and computing the first metric level from the difference in the output signals. In some implementations, an acoustic energy level may be determined by comparing the output signals from one or more sensor pixels in the first set of regions to a foreground value acquired with the ultrasonic transmitter on (e.g., enabled), and computing the first metric level from the difference in the output signals. The presence or absence of a finger on a surface of a platen coupled to the ultrasonic sensor impacts the acoustic energy level of the received signals. In some implementations, an acoustic loading level may be determined by comparing a statistical quantity such as an average, a weighted average, a standard deviation, etc. of the output signals from one or more sensor pixels in the first set of regions to a background statistical quantity determined with the ultrasonic off or to a foreground statistical quantity determined with the ultrasonic transmitter on. The presence or absence of a finger impacts the acoustic loading level. In some implementations, a spatial frequency may be determined from acquired output signals from a plurality of pixels in the first set of regions by executing a fast Fourier transform (FFT) on the acquired output signals. For example, a spatial frequency in the range of one to five line pairs per millimeter, or more closely in the range of two to three line pairs per millimeter may indicate the presence or absence of fingerprint ridges and valleys that are indicative of the presence or absence of a finger. In some implementations, a cross-correlation value may be determined by comparing the output signals from a set of one or more pixels in the first set of regions to an adjacent set of one or more pixels in the first set of regions. Lack of a presence of a finger tends to result in detecting noise and/or random variations between adjacent pixels or sets of one or more pixels, whereas the presence of a finger may result in significant signal differences between adjacent pixels or sets of one or more pixels due to ridges and valleys of a finger or other texture of an object positioned against the platen. In some implementations, an image quality value may be determined from acquired output signals from one or more pixels in the first set of regions. For example, an image quality value may correspond to a contrast ratio between regions that may represent a ridge of a finger and regions that may represent a valley of the finger. In another example, an image quality value may correspond to the rate at which pixel output signals change from one pixel to the next or one group of pixels to the next, indicating good feature definition.

In some implementations, more than one metric level may be combined to form a composite metric level, which may provide a better determination of the presence of a finger. In some implementations, the second metric level may be determined in a manner similar to the determination of the first metric level. In some implementations, the second metric level may have similar threshold values to the first metric level; while in other implementations, the second metric level may have a higher threshold value.

According to aspects of the present disclosure, the first set of regions may correspond to sensor pixels selected from one of a set of lines (e.g., a set of rows), a set of partial lines, a set of columns, a set of partial columns, a set of blocks, a set of sub-blocks, a set of separated pixels, a continuous line, a continuous partial line, a continuous column, a continuous partial column, a continuous block, a continuous sub-block, a set of continuous regions, a set of discontinuous regions, or some combination thereof. The first set of regions may be centered on an active area of an ultrasonic sensor array. In some implementations, the first set of regions may be centered on the active area to preferentially detect a finger that is positioned over the active area and to reduce detecting a finger that is positioned only over an edge of the active area.

In some implementations, the second set of regions may correspond to sensor pixels selected from one of a set of lines (e.g., a set of rows), a set of partial lines, a set of columns, a set of partial columns, a set of blocks, a set of sub-blocks, a set of separated pixels, a continuous line, a continuous partial line, a continuous column, a continuous partial column, a continuous block, a continuous sub-block, a set of continuous regions, a set of discontinuous regions, the entire active area, or some combination thereof. The second set of regions may be centered on the active area of the ultrasonic sensor array. The second set of regions generally includes more pixels than the first set of regions. A block or sub-block of sensor pixels may include a rectangular array of pixels with two or more adjacent pixels in a first direction within the array of pixels and two or more adjacent pixels in a second direction that is perpendicular to the first direction.

FIG. 6A illustrates a method of monitoring a first metric level of a first set of regions of the fingerprint image as shown in block 502 of FIG. 5 according to aspects of the present disclosure. In the example shown in FIG. 6A, in block 602, the method may receive first sampled data of the first set of regions of a fingerprint image at a first sampling rate. In some implementations, the first sampling rate may be five frames or partial frames per second for a sampling rate of 5 Hz.

In block 604, the method may determine the first metric level for indicating an initial prediction of a presence of a finger using the first sampled data. In the optional block 606, the method may monitor the first metric level of the first set of regions of the fingerprint image in response to the first metric level being less than or equal to the first threshold. In some implementations, the first set of regions of the fingerprint image may include a set of pixels arranged along a plurality of lines, where the set of pixels may include a 270-pixel pattern. The 270-pixel pattern may include five lines of 54 pixels per line, and where each line may include three line segments of 18 pixels per line segment.

FIG. 6B illustrates a method of determining a second metric level of a second set of regions of the fingerprint image as shown in block 504 of FIG. 5 according to aspects of the present disclosure. As shown in FIG. 6B, in block 612, the method may receive second sampled data of the second set of regions of the fingerprint image at a second sampling rate. The second sampling rate can be one time. In some implementations, the second sampling rate may be just once or at a frequency depending on the size of the fingerprint image being monitored, resolution, power consumption, and/or other factors. In some implementations, the second sampling rate may be equal to or faster than the first sampling rate. In block 614, the method may determine the second metric level for indicating a finer prediction of a presence of a finger using the second sampled data. In some implementations, the second set of regions of the fingerprint image may include a set of pixels arranged in a plurality of clusters, where the set of pixels may include a 1782-pixel pattern. In some implementations, the 1782-pixel pattern may include three sub-blocks of pixels, with each sub-block having a size of 18 pixels by 33 pixels.

FIG. 6C illustrates a method of activating the device based on the second metric level of the second set of regions of the fingerprint image as shown in block 506 of FIG. 5 according to aspects of the present disclosure. In the embodiment of FIG. 6C, in block 622, the method may determine a presence of a finger in response to the second metric level exceeding a second threshold. In block 624, the method may activate the device in response to the presence of the finger being determined. In the optional block 626, the method may monitor the first metric level of the first set of regions of the fingerprint image in response to the second metric level being less than or equal to the second threshold.

FIG. 6D illustrates an exemplary method of determining a metric level for a set of regions of the fingerprint image according to aspects of the present disclosure. In the embodiment of FIG. 6D, in block 632, the method may determine a change in foreground based on a presence of the fingerprint image. In block 634, the method may perform a background estimation for the first set of regions of the fingerprint image. In block 636, the method may determine the first metric level of the first set of regions based on differences between the change in foreground and the background estimation for the first set of regions of the fingerprint image.

FIG. 6E illustrates an exemplary method of determining the change in foreground for a set of regions of the fingerprint image according to aspects of the present disclosure. In the embodiment of FIG. 6E, in block 642, the method may receive first sampled foreground data in the first set of sampled data, where the first sampled foreground data is collected with an ultrasonic transmitter in an enabled state (also referred to as an ON state). In block 644, the method may receive second sampled foreground data in the first set of sampled data, where the second sampled foreground data is collected with the ultrasonic transmitter in a disabled state (also referred to as an OFF state). In block 646, the method may compute the change in foreground for the set of regions of the fingerprint image as a difference between the first sampled foreground data and the second sampled foreground data. Note that the difference between the first sampled foreground data and the second sampled foreground data may be configured to reduce signals due to a pyroelectric effect introduced when a finger/object touches or is positioned near a piezoelectric layer of an ultrasonic sensor. A pyroelectric effect may be caused by the ability of certain materials such as piezoelectric materials to generate a temporary voltage when the materials are heated or cooled. The change in temperature modifies the positions of the atoms slightly within the crystal structure, such that the polarization of the material changes. This polarization change gives rise to a surface charge on a surface of the pyroelectric material and generates a voltage across the crystal. If the temperature stays constant at its new value, the pyroelectric voltage gradually disappears due to charge leakage. The leakage can be due to electrons moving through the crystal, ions moving through the air, current leaking through a voltmeter attached across the crystal, etc. By reducing or canceling out the pyroelectric effect, a more accurate ultrasonic signal can be obtained.

Figure 6F:
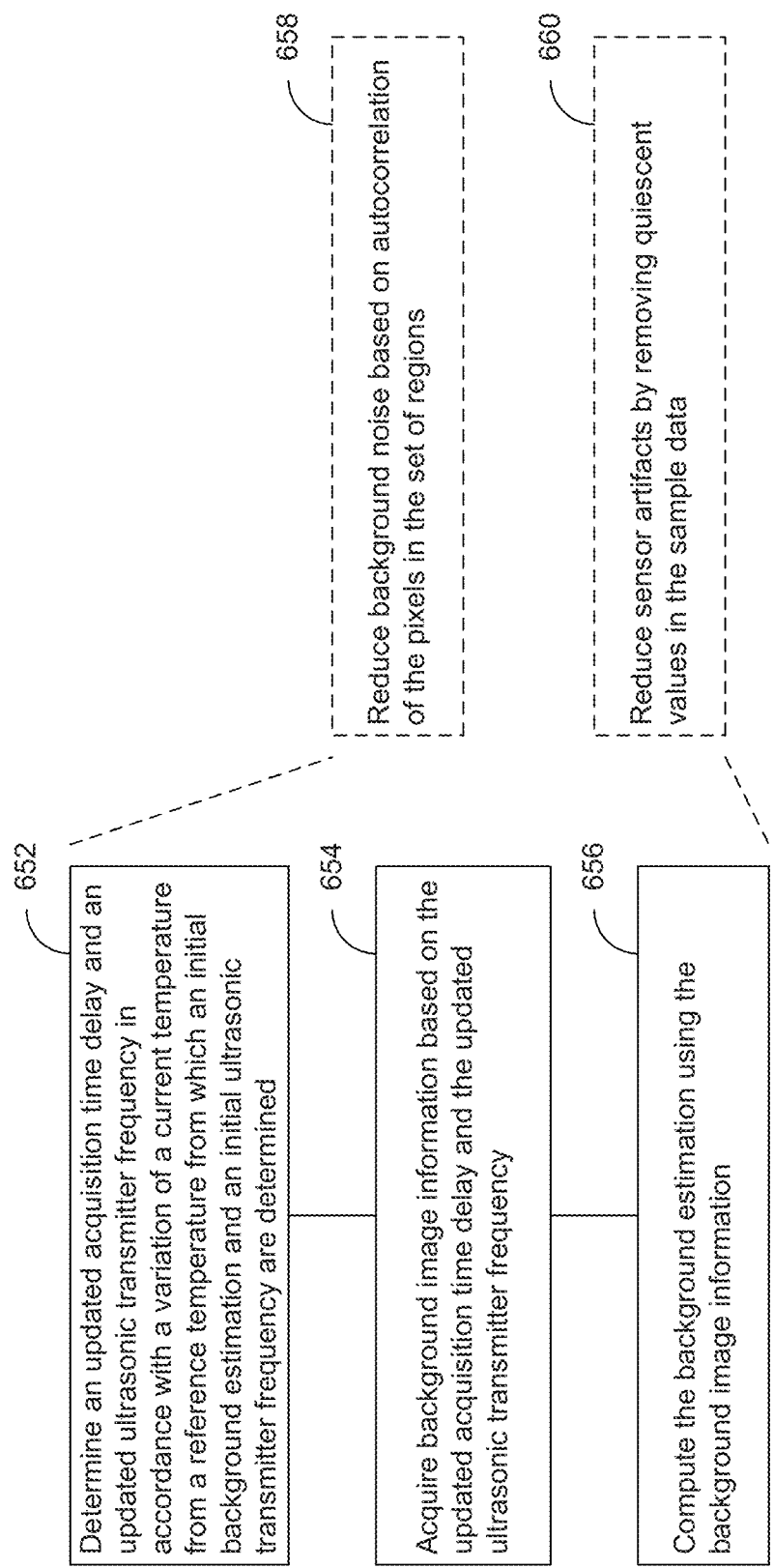
FIG. 6F illustrates an exemplary method of performing background estimation according to aspects of the present disclosure.

FIG. 6F illustrates an exemplary method of performing background estimation according to aspects of the present disclosure. In the embodiment of FIG. 6F, in block 652, the method may determine an updated acquisition time delay and an updated ultrasonic transmitter frequency in accordance with a variation of a current temperature relative to a reference temperature from which an initial background estimation and an initial ultrasonic transmitter frequency may be determined. In block 654, the method may acquire background image information based on the updated acquisition time delay and the updated ultrasonic transmitter frequency. In block 656, the method may compute the background estimation using the background image information.

Optionally or additionally, the method may perform at least one of: reduce background noise based on autocorrelation of the pixels in the set of regions (block 658); reduce sensor artifacts by removing quiescent values in the sampled data (block 660); or a combination thereof. In one implementation, autocorrelation of the pixels in the set of regions may be performed with a shift or lag of one pixel in the horizontal direction in the fingerprint image shown in FIG. 3.

Note that the methods described in FIG. 6D to FIG. 6F may be employed to determine the first metric level for indicating an initial prediction of a presence of a finger using the first sampled data as well as to determine the second metric level for indicating a finer prediction of a presence of a finger using the second sampled data.

Figure 7:
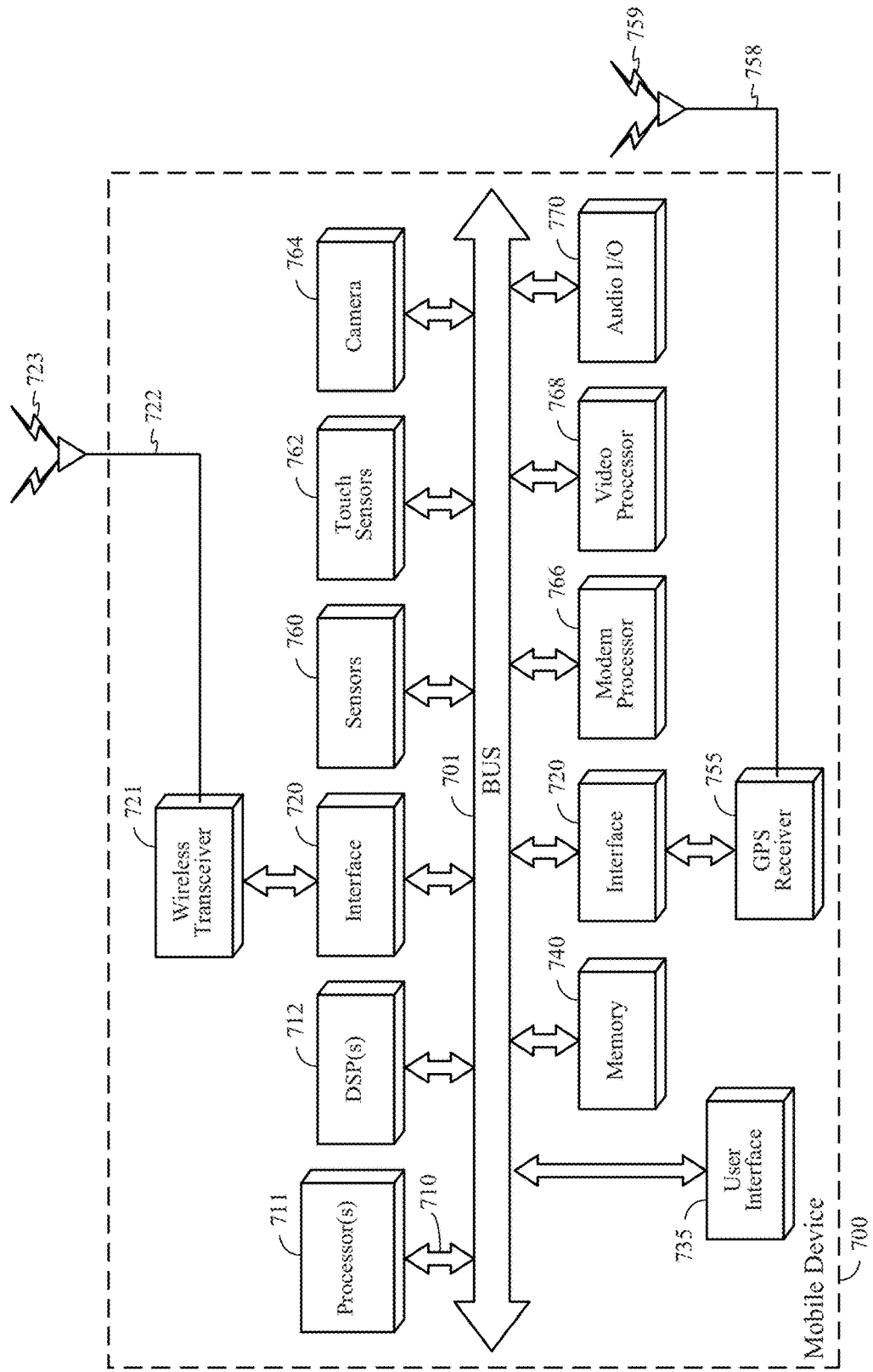
FIG. 7 illustrates an exemplary block diagram of a device that may be configured to implement a gradual power wake-up mechanism according to aspects of the present disclosure.

FIG. 7 illustrates an exemplary block diagram of a device that may be configured to implement the gradual power wake-up mechanism according to aspects of the present disclosure. A device that may implement the gradual power wake-up mechanism may include one or more features of mobile device 700 shown in FIG. 7. In certain embodiments, mobile device 700 may include a wireless transceiver 721 that is capable of transmitting and receiving wireless signals 723 via wireless antenna 722 over a wireless communication network. Wireless transceiver 721 may be connected to bus 701 by a wireless transceiver bus interface 720. Wireless transceiver bus interface 720 may, in some embodiments be at least partially integrated with wireless transceiver 721. Some embodiments may include multiple wireless transceivers 721 and wireless antennas 722 to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth®, etc.

Mobile device 700 may also include GPS receiver 755 capable of receiving and acquiring GPS signals 759 via GPS antenna 758. GPS receiver 755 may also process, in whole or in part, acquired GPS signals 759 for estimating a location of a mobile device. In some embodiments, processor(s) 711, memory 740, DSP(s) 712 and/or specialized processors (not shown) may also be utilized to process acquired GPS signals, in whole or in part, and/or calculate an estimated location of mobile device 700, in conjunction with GPS receiver 755. Storage of GPS or other signals may be performed in memory 740 or registers (not shown).

Also shown in FIG. 7, mobile device 700 may include digital signal processor(s) (DSP(s)) 712 connected to the bus 701 by a bus interface 710, processor(s) 711 connected to the bus 701 by a bus interface 710 and memory 740. Bus interface 710 may be integrated with the DSP(s) 712, processor(s) 711 and memory 740. In various embodiments, functions may be performed in response execution of one or more machine-readable instructions stored in memory 740 such as on a computer-readable storage medium, such as RAM, ROM, FLASH, or disc drive, just to name a few examples. The one or more instructions may be executable by processor(s) 711, specialized processors, or DSP(s) 712. Memory 740 may include a non-transitory processor-readable memory and/or a computer-readable memory that stores software code (programming code, instructions, etc.) that are executable by processor(s) 711 and/or DSP(s) 712 to perform functions described herein. In a particular implementation, wireless transceiver 721 may communicate with processor(s) 711 and/or DSP(s) 712 through bus 701 to enable mobile device 700 to be configured as a wireless station. Processor(s) 711 and/or DSP(s) 712 may perform the methods and functions, and execute instructions to execute one or more aspects of processes/methods discussed in connection with FIG. 1 to FIG. 6F and FIG. 8 to FIG. 9B.

Also shown in FIG. 7, a user interface 735 may include any one of several devices such as, for example, a speaker, microphone, display device, vibration device, keyboard, touch screen, etc. A user interface signal provided to a user may be one or more outputs provided by any of the speaker, microphone, display device, vibration device, keyboard, touch screen, etc. In a particular implementation, user interface 735 may enable a user to interact with one or more applications hosted on mobile device 700. For example, devices of user interface 735 may store analog or digital signals on memory 740 to be further processed by DSP(s) 712 or processor 711 in response to action from a user. Similarly, applications hosted on mobile device 700 may store analog or digital signals on memory 740 to present an output signal to a user. In another implementation, mobile device 700 may optionally include a dedicated audio input/output (I/O) device 770 comprising, for example, a dedicated speaker, microphone, digital to analog circuitry, analog to digital circuitry, amplifiers and/or gain control. In another implementation, mobile device 700 may include touch sensors 762 responsive to touching, pressure, or ultrasonic signals on a keyboard or touch screen device.

Mobile device 700 may also include a dedicated camera device 764 for capturing still or moving imagery. Dedicated camera device 764 may include, for example an imaging sensor (e.g., charge coupled device or CMOS imager), lens, analog to digital circuitry, frame buffers, etc. In one implementation, additional processing, conditioning, encoding or compression of signals representing captured images may be performed at processor 711 or DSP(s) 712. Alternatively, a dedicated video processor 768 may perform conditioning, encoding, compression or manipulation of signals representing captured images. Additionally, dedicated video processor 768 may decode/decompress stored image data for presentation on a display device (not shown) on mobile device 700.

Mobile device 700 may also include sensors 760 coupled to bus 701 which may include, for example, inertial sensors and environmental sensors. Inertial sensors of sensors 760 may include, for example accelerometers (e.g., collectively responding to acceleration of mobile device 700 in three dimensions), one or more gyroscopes or one or more magnetometers (e.g., to support one or more compass applications). Environmental sensors of mobile device 700 may include, for example, temperature sensors, barometric pressure sensors, ambient light sensors, and camera imagers, microphones, just to name few examples. Sensors 760 may generate analog or digital signals that may be stored in memory 740 and processed by DPS(s) or processor 711 in support of one or more applications such as, for example, applications directed to positioning or navigation operations.

In a particular implementation, mobile device 700 may include a dedicated baseband modem processor 766 capable of performing baseband processing of signals received and down-converted at wireless transceiver 721 or GPS receiver 755. Similarly, dedicated modem processor 766 may perform baseband processing of signals to be up-converted for transmission by wireless transceiver 721. In alternative implementations, instead of having a dedicated modem processor, baseband processing may be performed by a processor or DSP (e.g., processor 711 or DSP(s) 712).

Figure 8A:
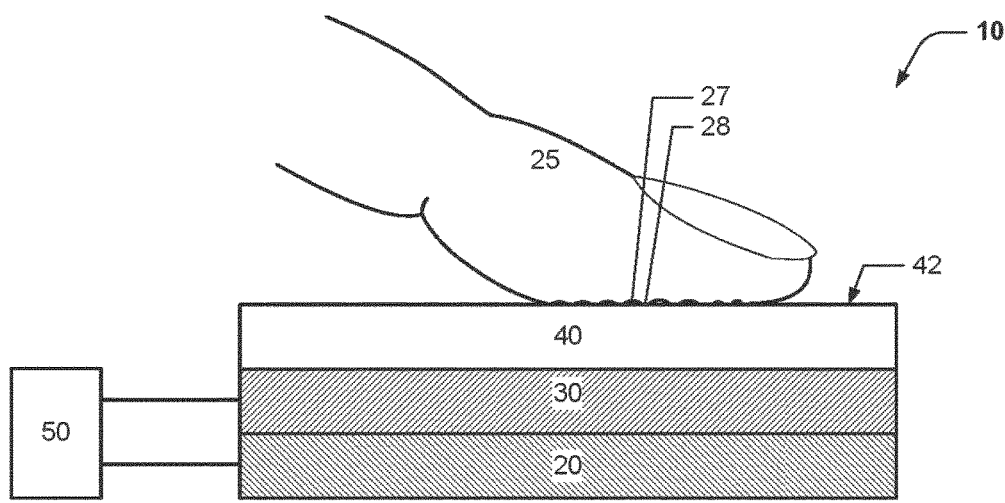
FIGS. 8A-8C illustrate an example of an ultrasonic sensor according to aspects of the present disclosure.
Figure 8B:
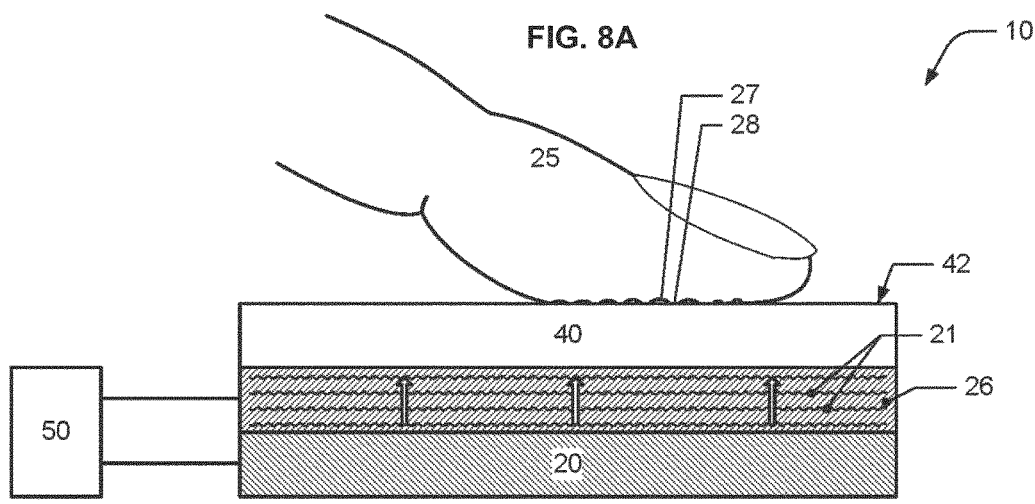
Figure 8C:
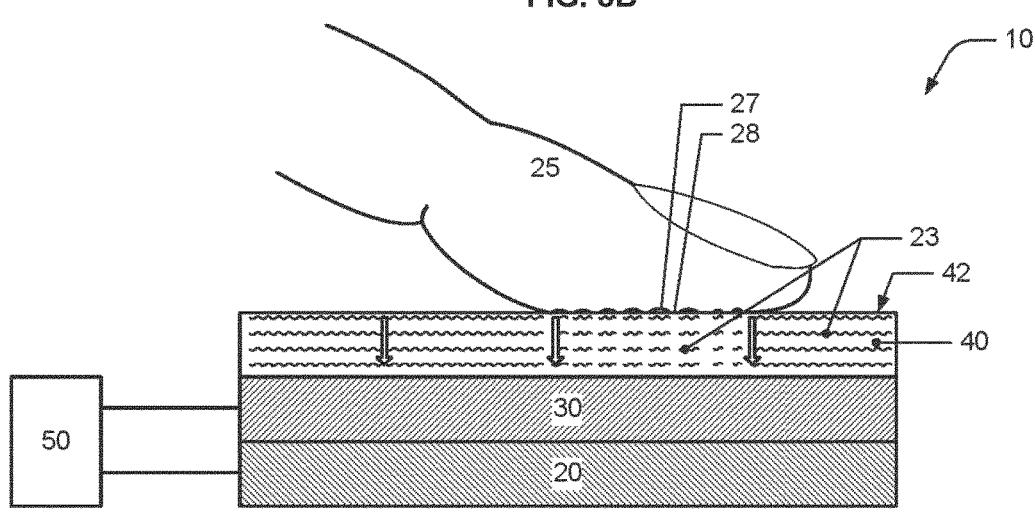

FIGS. 8A-8C illustrate an example of an ultrasonic sensor according to aspects of the present disclosure. As shown in FIG. 8A, an ultrasonic sensor 10 may include an ultrasonic transmitter 20 and an ultrasonic receiver 30 under a platen 40. The ultrasonic transmitter 20 may be a piezoelectric transmitter that can generate ultrasonic waves 21 (see FIG. 8B). The ultrasonic receiver 30 may include a piezoelectric material and an array of pixel circuits disposed in or on a substrate. In some implementations, the substrate may be a glass, plastic or semiconductor substrate such as a silicon substrate. In operation, the ultrasonic transmitter 20 may generate one or more ultrasonic waves that travel through the ultrasonic receiver 30 to the exposed surface 42 of the platen 40. At the exposed surface 42 of the platen 40, the ultrasonic energy may be transmitted, absorbed or scattered by an object 25 that is in contact with the platen 40, such as the skin of a fingerprint ridge 28, or reflected back. In those locations where air contacts the exposed surface 42 of the platen 40, e.g., valleys 27 between fingerprint ridges 28, most of the ultrasonic wave will be reflected back toward the ultrasonic receiver 30 for detection (see FIG. 8C). Control electronics 50 may be coupled to the ultrasonic transmitter 20 and ultrasonic receiver 30 and may supply timing signals that cause the ultrasonic transmitter 20 to generate one or more ultrasonic waves 21. The control electronics 50 may then receive signals from the ultrasonic receiver 30 that are indicative of reflected ultrasonic energy 23. The control electronics 50 may use output signals received from the ultrasonic receiver 30 to construct a digital image of the object 25. In some implementations, the control electronics 50 may also, over time, successively sample the output signals to detect the presence and/or movement of the object 25.

According to aspects of the present disclosure, the ultrasonic transmitter 20 may be a plane wave generator including a substantially planar piezoelectric transmitter layer. Ultrasonic waves may be generated by applying a voltage to the piezoelectric layer to expand or contract the layer, depending upon the signal applied, thereby generating a plane wave. The voltage may be applied to the piezoelectric transmitter layer via a first transmitter electrode and a second transmitter electrode. In this fashion, an ultrasonic wave may be made by changing the thickness of the layer via a piezoelectric effect. This ultrasonic wave travels toward a finger (or other object to be detected), passing through the platen 40. A portion of the wave not absorbed or transmitted by the object to be detected may be reflected so as to pass back through the platen 40 and be received by the ultrasonic receiver 30. The first and second transmitter electrodes may be metallized electrodes, for example, metal layers that coat opposing sides of the piezoelectric transmitter layer.

The ultrasonic receiver 30 may include an array of pixel circuits disposed in or on a substrate, which also may be referred to as a wafer or a backplane, and a piezoelectric receiver layer. In some implementations, each pixel circuit may include one or more silicon or thin-film transistor (TFT) elements, electrical interconnect traces and, in some implementations, one or more additional circuit elements such as diodes, capacitors, and the like. Each pixel circuit may be configured to convert an electric charge generated in the piezoelectric receiver layer proximate to the pixel circuit into an electrical signal. Each pixel circuit may include a pixel input electrode that electrically couples the piezoelectric receiver layer to the pixel circuit.

Figure 9A:
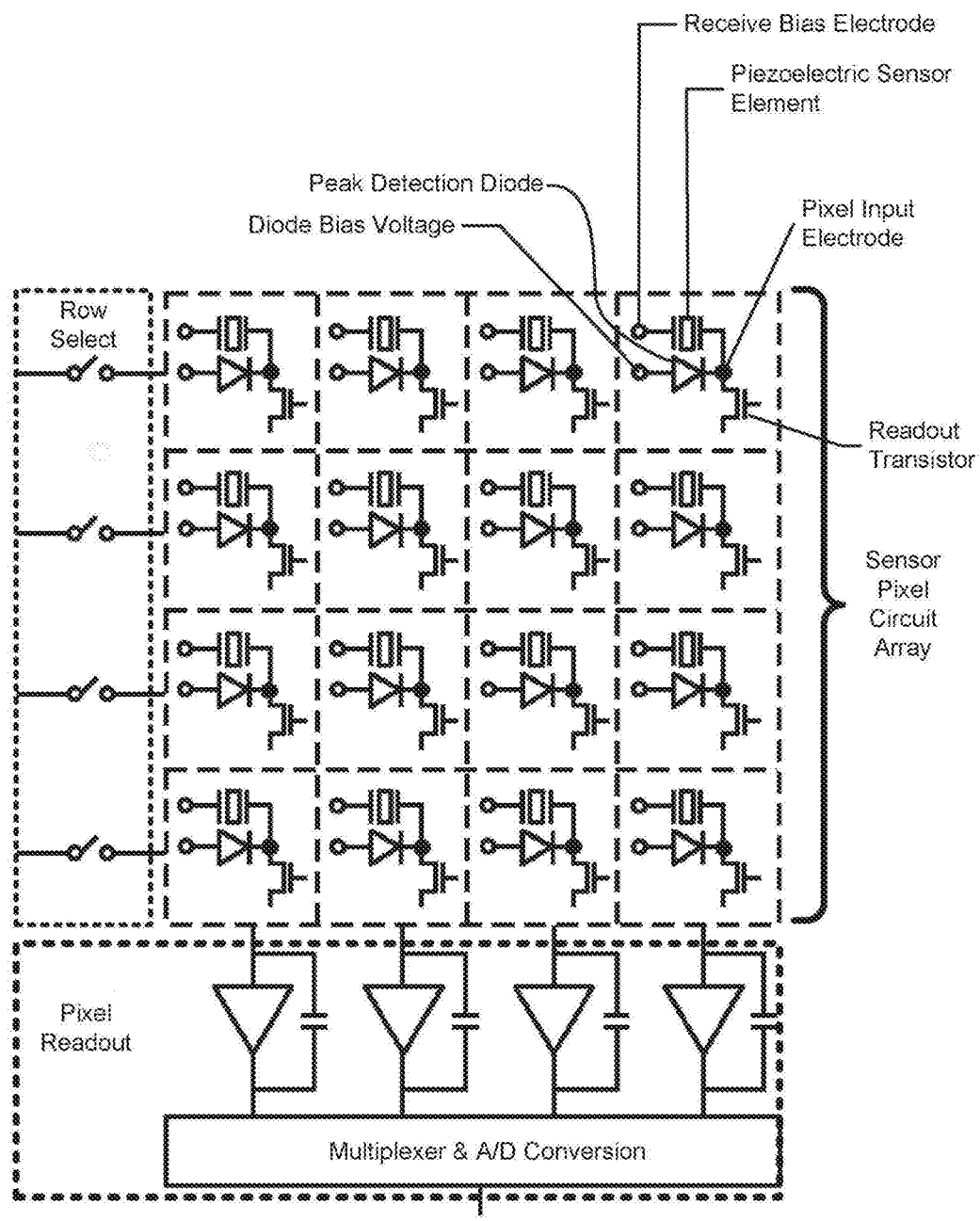
FIG. 9A illustrates an example of a four-by-four array of sensor pixels for an ultrasonic sensor array according to aspects of the present disclosure.

In the illustrated implementation, a receiver bias electrode is disposed on a side of the piezoelectric receiver layer proximal to platen 40. The receiver bias electrode may be a metallized electrode and may be grounded or biased to control which signals are passed to the silicon or TFT sensor array. Ultrasonic energy that is reflected from the exposed (top) surface 42 of the platen 40 is converted into localized electrical charges by the piezoelectric receiver layer. These localized charges are collected by the pixel input electrodes and are passed on to the underlying pixel circuits. The charges may be amplified by the pixel circuits and provided to the control electronics, which processes the output signals. A simplified schematic of an example pixel circuit is shown in FIG. 9A, however one of ordinary skill in the art will appreciate that many variations of and modifications to the example pixel circuit shown in the simplified schematic may be contemplated.

Control electronics 50 may be electrically connected to the first transmitter electrode and the second transmitter electrode, as well as to the receiver bias electrode and the pixel circuits in or on the substrate. The control electronics 50 may operate substantially as discussed previously with respect to FIGS. 8A-8C.

The platen 40 may be any appropriate material that can be acoustically coupled to the receiver, with examples including plastic, ceramic, glass, sapphire, stainless steel, aluminum, a metal, a metal alloy, polycarbonate, a polymeric material, or a metal-filled plastic. In some implementations, the platen 40 may be a cover plate, e.g., a cover glass or a lens glass for a display device or an ultrasonic sensor. Detection and imaging may be performed through relatively thick platens if desired, e.g., 3 mm and above.

Examples of piezoelectric materials that may be employed according to various implementations include piezoelectric polymers having appropriate acoustic properties, for example, acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be employed include polyvinylidene chloride (PVDC) homopolymers and copolymers, polytetrafluoroethylene (PTFE) homopolymers and copolymers, and diisopropylammonium bromide (DIPAB).

The thickness of each of the piezoelectric transmitter layer and the piezoelectric receiver layer may be selected so as to be suitable for generating and receiving ultrasonic waves. In one example, a PVDF piezoelectric transmitter layer may be approximately 28 μm thick and a PVDF-TrFE receiver layer may be approximately 12 μm thick. Example frequencies of the ultrasonic waves are in the range of 5 MHz to 30 MHz, with wavelengths on the order of a quarter of a millimeter or less.

FIGS. 8A-8C show example arrangements of ultrasonic transmitters and receivers in an ultrasonic sensor, with other arrangements possible. For example, in some implementations, the ultrasonic transmitter 20 may be above the ultrasonic receiver 30, i.e., closer to the object of detection. In some implementations, the piezoelectric receiver layer may serve as both an ultrasonic transmitter and an ultrasonic receiver. A piezoelectric layer that may serve as either an ultrasonic transmitter or an ultrasonic receiver may be referred to as a piezoelectric transceiver layer or as a single-layer transmitter/receiver layer. In some implementations, the ultrasonic sensor may include an acoustic delay layer. For example, an acoustic delay layer may be incorporated into the ultrasonic sensor 10 between the ultrasonic transmitter 20 and the ultrasonic receiver 30. An acoustic delay layer may be employed to adjust the ultrasonic pulse timing, and at the same time electrically insulate the ultrasonic receiver 30 from the ultrasonic transmitter 20. The delay layer may have a substantially uniform thickness, with the material used for the delay layer and/or the thickness of the delay layer selected to provide a desired delay in the time for reflected ultrasonic energy to reach the ultrasonic receiver 30. In doing so, the range of time during which an energy pulse that carries information about the object by virtue of having been reflected by the object may be made to arrive at the ultrasonic receiver 30 during a time range when it is unlikely that energy reflected from other parts of the ultrasonic sensor 10 is arriving at the ultrasonic receiver 30. In some implementations, the silicon or TFT substrate and/or the platen 40 may serve as an acoustic delay layer.

FIG. 9A depicts a 4×4 pixel array of pixels for an ultrasonic sensor. Each pixel may, for example, be associated with a local region of piezoelectric sensor material, a peak detection diode and a readout transistor; many or all of these elements may be formed on or in the backplane to form the pixel circuit. In practice, the local region of piezoelectric sensor material of each pixel may transduce received ultrasonic energy into electrical charges. The peak detection diode may register the maximum amount of charge detected by the local region of piezoelectric sensor material. Each row of the pixel array may then be scanned, e.g., through a row select mechanism, a gate driver, or a shift register, and the readout transistor for each column may be triggered to allow the magnitude of the peak charge for each pixel to be read by additional circuitry, e.g., a multiplexer and an A/D converter. The pixel circuit may include one or more silicon transistors or TFTs to allow gating, addressing, and resetting of the pixel.

Each pixel circuit may provide information about a small portion of the object detected by the ultrasonic sensor 10. While, for convenience of illustration, the example shown in FIG. 9A is of a relatively coarse resolution, ultrasonic sensors having a resolution on the order of 500 pixels per inch or higher may be configured with a layered structure. The detection area of the ultrasonic sensor 10 may be selected depending on the intended object of detection. For example, the detection area (e.g., active area) may range from about 5 mm×5 mm for a single finger to about 3 inches×3 inches for four fingers. Smaller and larger areas, including square, rectangular and non-rectangular geometries, may be used as appropriate for the object.

Figure 9B:
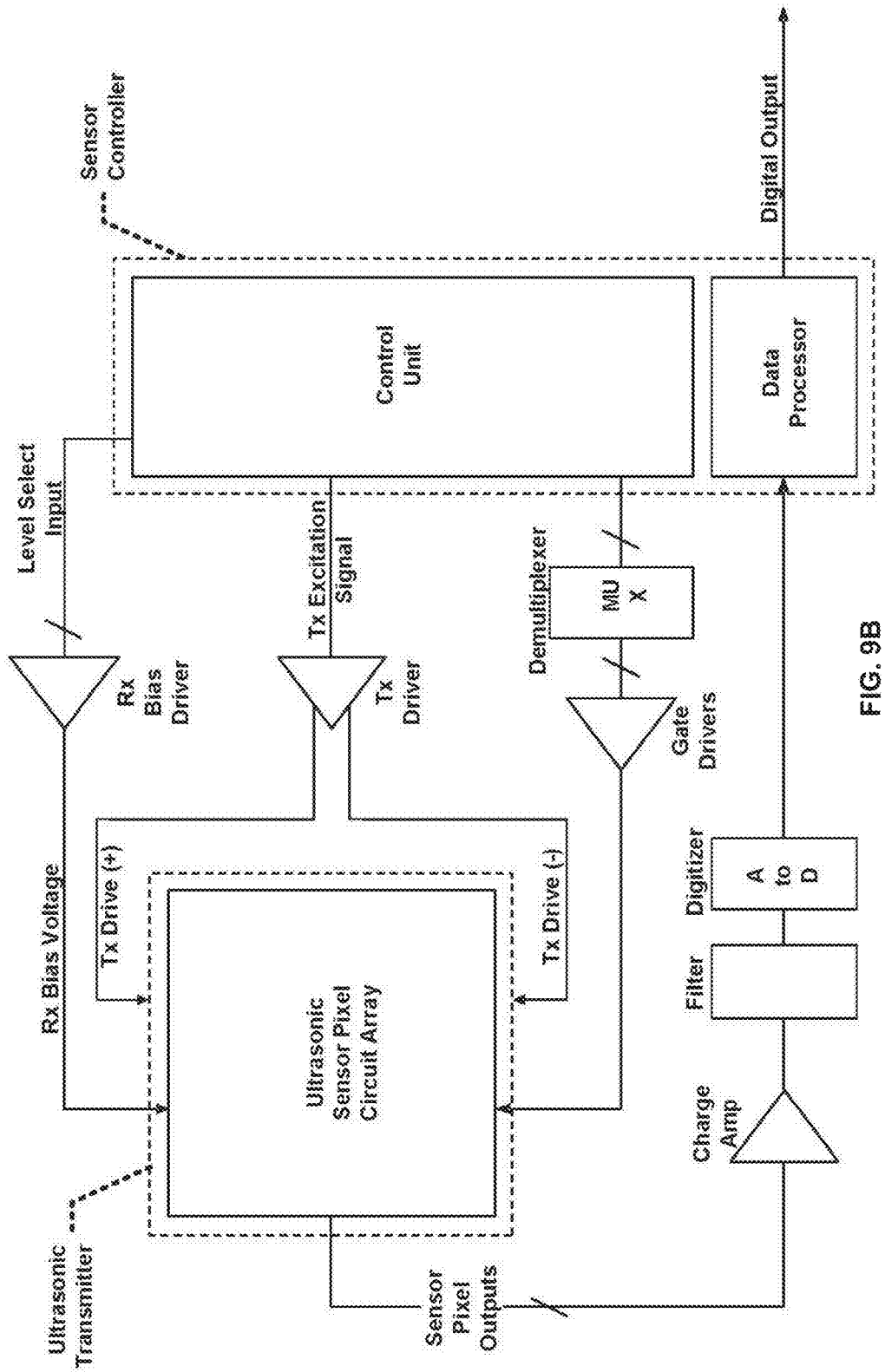
FIG. 9B illustrates an example of a high-level block diagram of an ultrasonic sensor system according to aspects of the present disclosure.

FIG. 9B shows an example of a high-level block diagram of an ultrasonic sensor system. Many of the elements shown may form part of control electronics 50. A sensor controller may include a control unit that is configured to control various aspects of the sensor system, e.g., ultrasonic transmitter timing and excitation waveforms, bias voltages for the ultrasonic receiver and pixel circuitry, pixel addressing, signal filtering and conversion, readout frame rates, and so forth. The sensor controller may also include a data processor that receives data from the ultrasonic sensor circuit pixel array. The data processor may translate the digitized data into image data of a fingerprint or format the data for further processing.

For example, the control unit may send a transmitter (Tx) excitation signal to a Tx driver at regular intervals to cause the Tx driver to excite the ultrasonic transmitter and produce planar ultrasonic waves. The control unit may send level select input signals through a receiver (Rx) bias driver to bias the receiver bias electrode and allow gating of acoustic signal detection by the pixel circuitry. A demultiplexer may be used to turn on and off gate drivers that cause a particular row or column of sensor pixel circuits to provide sensor output signals. Output signals from the pixels may be sent through a charge amplifier, a filter such as an RC filter or an anti-aliasing filter, and a digitizer to the data processor. Note that portions of the system may be included on the silicon or TFT substrate and other portions may be included in an associated integrated circuit (e.g., an ASIC).

According to aspects of the present disclosure, ultrasonic sensors may be configured to produce high-resolution fingerprint images for user verification and authentication. In some implementations, ultrasonic fingerprint sensors may be configured to detect reflected signals proportional to the differential acoustic impedance between an outer surface of a platen and a finger ridge (tissue) and valley (air). For example, a portion of the ultrasonic wave energy of an ultrasonic wave may be transmitted from the sensor into finger tissue in the ridge areas while the remaining portion of the ultrasonic wave energy is reflected back towards the sensor, whereas a smaller portion of the wave may be transmitted into the air in the valley regions of the finger while the remaining portion of the ultrasonic wave energy is reflected back to the sensor. Methods of correcting diffraction effects disclosed herein may increase the overall signal and image contrast from the sensor.

Note that at least the following three paragraphs, FIG. 1-FIG. 2, FIG. 5-FIG. 9 and their corresponding descriptions provide means for monitoring a first metric level of a first set of regions of the fingerprint image; means for determining a second metric level of a second set of regions of the fingerprint image in response to the first metric level exceeding a first threshold, where the second set of regions includes more pixels than the first set of regions; means for activating the device based on the second metric level of the second set of regions of the fingerprint image; means for receiving first sampled data from the first set of regions of the fingerprint image at a first sampling rate; means for determining the first metric level for indicating an initial prediction of a presence of a finger using the first sampled data; means for receiving second sampled data from the second set of regions of the fingerprint image; means for determining the second metric level for indicating a finer prediction of a presence of a finger using the second sampled data; means for determining a presence of a finger in response to the second metric level exceeding a second threshold; means for activating the device in response to the presence of the finger; means for determining a change in foreground based on a presence of the fingerprint image; means for performing a background estimation for the first set of regions of the fingerprint image; and means for determining the first metric level of the first set of regions based on differences between the change in foreground and the background estimation for the first set of regions of the fingerprint image.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may include an IEEE 802.11x network, and a WPAN may include a Bluetooth network, an IEEE 802.15x, for example. Wireless communication implementations described herein may also be used in connection with any combination of WWAN, WLAN or WPAN.

In another aspect, as previously mentioned, a wireless transmitter or access point may include a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may include electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

We claim:

1. A method for use in activating a device based on detection of a fingerprint image, the method comprising:
   monitoring a first metric level of a first set of regions of a fingerprint image, and continuing to monitor the first metric level of the first set of regions of the fingerprint image in response to the first metric level being less than a first threshold, wherein the first metric level represents an acoustic energy level of the first set of regions of the fingerprint image;
   determining a second metric level of a second set of regions of the fingerprint image in response to the first metric level exceeding the first threshold, wherein the second set of regions includes more pixels than the first set of regions, and wherein the second metric level represent an acoustic energy level of the second set of regions of the fingerprint image; and
   activating the device based on the second metric level of the second set of regions of the fingerprint image.

2. The method of claim 1, wherein the first metric level and the second metric level represent at least one of an acoustic loading level, a spatial frequency, or a cross-correlation value.

3. The method of claim 1, wherein monitoring the first metric level of the first set of regions of the fingerprint image comprises:
   receiving a first sampled data from the first set of regions of the fingerprint image at a first sampling rate; and
   determining the first metric level for indicating an initial prediction of a presence of a finger using the first sampled data.

4. The method of claim 3, further comprising:
   monitoring the first metric level of the first set of regions of the fingerprint image in response to the first metric level being less than or equal to the first threshold.

5. The method of claim 1, wherein determining the second metric level of the second set of regions of the fingerprint image comprises:
   receiving a second sampled data from the second set of regions of the fingerprint image; and
   determining the second metric level for indicating a finer prediction of a presence of a finger using the second sampled data.

6. The method of claim 1, wherein activating the device based on the second metric level of the second set of regions of the fingerprint image comprises:
   determining a presence of a finger in response to the second metric level exceeding a second threshold; and
   activating the device in response to the presence of the finger.

7. The method of claim 6, further comprising:
   monitoring the first metric level of the first set of regions of the fingerprint image in response to the second metric level being less than or equal to the second threshold.

8. The method of claim 3, wherein determining the first metric level of the first set of regions of the fingerprint image comprises:
   determining a change in foreground based on a presence of the fingerprint image;
   performing a background estimation for the first set of regions of the fingerprint image; and
   determining the first metric level of the first set of regions based on differences between the change in foreground and the background estimation for the first set of regions of the fingerprint image.

9. The method of claim 8, wherein determining the change in foreground comprises:
   receiving a first sampled foreground data in the first set of sampled data, wherein the first sampled foreground data is collected with an ultrasonic transmitter in an enabled state;
   receiving a second sampled foreground data in the first set of sampled data, wherein the second sampled foreground data is collected with the ultrasonic transmitter in a disabled state; and
   computing the change in foreground for the first set of regions of the fingerprint image as a difference between the first sampled foreground data and the second sampled foreground data.

10. The method of claim 8, wherein performing the background estimation comprises:
  determining an updated acquisition time delay and an updated ultrasonic transmitter frequency in accordance with a variation of a current temperature from a reference temperature from which an initial background estimation and an initial ultrasonic transmitter frequency are determined;
  acquiring a background image information based on the updated acquisition time delay and the updated ultrasonic transmitter frequency; and
  computing the background estimation using the background image information.

11. The method of claim 10, further comprising at least one of:
  reducing background noise based on autocorrelation of the pixels in the first set of regions;
  reducing sensor artifacts by removing quiescent values in the first sampled data;
  or a combination thereof.

12. A device, comprising:
  a sensor having a plurality of sensor pixels configured to sense a fingerprint image;
  a memory configured to store the fingerprint image; and
  a controller coupled to the sensor and the memory and configured to:
    monitor a first metric level of a first set of regions of the fingerprint image, and continue to monitor the first metric level of the first set of regions of the fingerprint image in response to the first metric level being less than a first threshold, wherein the first metric level represents an acoustic energy level of the first set of regions of the fingerprint image;
    determining a second metric level of a second set of regions of the fingerprint image in response to the first metric level exceeding the first threshold, wherein the second set of regions includes more pixels than the first set of regions, and wherein the second metric level represent an acoustic energy level of the second set of regions of the fingerprint image; and
    activate the device based on the second metric level of the second set of regions of the fingerprint image.

13. The device of claim 12, wherein the first metric level and the second metric level represent at least one of an acoustic loading level, a spatial frequency, or a cross-correlation value.

14. The device of claim 12, wherein the controller is further configured to:
  receive a first sampled data from the first set of regions of the fingerprint image at a first sampling rate; and
  determine the first metric level for indicating an initial prediction of a presence of a finger using the first sampled data.

15. The device of claim 14, wherein the controller is further configured to:
  monitor the first metric level of the first set of regions of the fingerprint image in response to the first metric level being less than or equal to the first threshold.

16. The device of claim 12, wherein the controller is further configured to:
  receive a second sampled data from the second set of regions of the fingerprint image; and
  determine the second metric level for indicating a finer prediction of a presence of a finger using the second sampled data.

17. The device of claim 12, wherein the controller is further configured to:
  determine a presence of a finger in response to the second metric level exceeding a second threshold; and
  activate the device in response to the presence of the finger.

18. The device of claim 17, wherein the controller is further configured to:
  monitor the first metric level of the first set of regions of the fingerprint image in response to the second metric level being less than or equal to the second threshold.

19. The device of claim 14, wherein the controller is further configured to:
  determine a change in foreground based on a presence of the fingerprint image;
  perform a background estimation for the first set of regions of the fingerprint image; and
  determine the first metric level of the first set of regions based on differences between the change in foreground and the background estimation for the first set of regions of the fingerprint image.

20. The device of claim 19, wherein the controller is further configured to:
  receive a first sampled foreground data in the first set of sampled data, wherein the first sampled foreground data is collected with an ultrasonic transmitter in an enabled state;
  receive a second sampled foreground data in the first set of sampled data, wherein the second sampled foreground data is collected with the ultrasonic transmitter in a disabled state; and
  compute the change in foreground for the first set of regions of the fingerprint image as a difference between the first sampled foreground data and the second sampled foreground data.

21. The device of claim 19, wherein the controller is further configured to:
  determine an updated acquisition time delay and an updated ultrasonic transmitter frequency in accordance with a variation of a current temperature from a reference temperature from which an initial background estimation and an initial ultrasonic transmitter frequency are determined;
  acquire a background image information based on the updated acquisition time delay and the updated ultrasonic transmitter frequency; and
  compute the background estimation using the background image information.

22. The device of claim 21, wherein the controller is further configured to perform at least one of:
  reduce background noise based on autocorrelation of the pixels in the first set of regions;
  reduce sensor artifacts by removing quiescent values in the first sampled data;
  or a combination thereof.

23. A non-transitory medium storing instructions for execution by one or more processors of a device, the instructions comprising:
  instructions for monitoring a first metric level of a first set of regions of a fingerprint image, and continuing to monitor the first metric level of the first set of regions of the fingerprint image in response to the first metric level being less than a first threshold, wherein the first metric level represents an acoustic energy level of the first set of regions of the fingerprint image;
  instructions for determining a second metric level of a second set of regions of the fingerprint image in response to the first metric level exceeding the first threshold, wherein the second set of regions includes more pixels than the first set of regions, and wherein the second metric level represent an acoustic energy level of the second set of regions of the fingerprint image; and instructions for activating the device based on the second metric level of the second set of regions of the fingerprint image.

24. The non-transitory medium of claim 23, wherein the instructions for monitoring the first metric level of the first set of regions of the fingerprint image comprise:

instructions for receiving a first sampled data from the first set of regions of the fingerprint image at a first sampling rate; and instructions for determining the first metric level for indicating an initial prediction of a presence of a finger using the first sampled data.

25. The non-transitory medium of claim 23, wherein the instructions for determining the second metric level of the second set of regions of the fingerprint image comprise:

instructions for receiving a second sampled data from the second set of regions of the fingerprint image; and instructions for determining the second metric level for indicating a finer prediction of a presence of a finger using the second sampled data.

26. The non-transitory medium of claim 23, wherein the instructions for activating the device based on the second metric level of the second set of regions of the fingerprint image comprise:

instructions for determining a presence of a finger in response to the second metric level exceeding a second threshold; and instructions for activating the device in response to the presence of the finger.

27. The non-transitory medium of claim 24, wherein the instructions for determining the first metric level of the first set of regions of the fingerprint image comprise:

instructions for determining a change in foreground based on a presence of the fingerprint image;

instructions for performing a background estimation for the first set of regions of the fingerprint image; and instructions for determining the first metric level of the first set of regions based on differences between the change in foreground and the background estimation for the first set of regions of the fingerprint image.

28. A device, comprising:

means for use in sensing a fingerprint image using a plurality of sensor pixels;

means for use in storing the fingerprint image;

means for monitoring a first metric level of a first set of regions of a fingerprint image, and continuing to monitor the first metric level of the first set of regions of the fingerprint image in response to the first metric level being less than a first threshold, wherein the first metric level represents an acoustic energy level of the first set of regions of the fingerprint image;

means for determining a second metric level of a second set of regions of the fingerprint image in response to the first metric level exceeding the first threshold, wherein the second set of regions includes more pixels than the first set of regions, and wherein the second metric level represent an acoustic energy level of the second set of regions of the fingerprint image; and means for activating the device based on the second metric level of the second set of regions of the fingerprint image.

29. The device of claim 28, wherein the means for monitoring the first metric level of the first set of regions of the fingerprint image comprises:

means for receiving a first sampled data from the first set of regions of the fingerprint image at a first sampling rate; and means for determining the first metric level for indicating an initial prediction of a presence of a finger using the first sampled data.

30. The device of claim 28, wherein the means for determining the second metric level of the second set of regions of the fingerprint image comprises:

means for receiving a second sampled data from the second set of regions of the fingerprint image; and means for determining the second metric level for indicating a finer prediction of a presence of a finger using the second sampled data.

* * * * *